US012655657B2

(12) United States Patent
Talpe

(10) Patent No.: US 12,655,657 B2
(45) Date of Patent: Jun. 16, 2026

(54) LOCK HAVING A REVERSIBLE LATCH BOLT

(71) Applicant: LOCINOX, Waregem (BE)

(72) Inventor: Joseph Talpe, Heestert-Zwevegem (BE)

(73) Assignee: LOCINOX, Waregem (BE)

(*) Notice: Subject to any disclaimer, the term of this patent is extended or adjusted under 35 U.S.C. 154(b) by 84 days.

(21) Appl. No.: 18/576,868

(22) PCT Filed: Jul. 6, 2022

(86) PCT No.: PCT/EP2022/068772
§ 371 (c)(1),
(2) Date: Jan. 5, 2024

(87) PCT Pub. No.: WO2023/280933
PCT Pub. Date: Jan. 12, 2023

(65) Prior Publication Data

US 2024/0247519 A1 Jul. 25, 2024

(30) Foreign Application Priority Data

Jul. 9, 2021 (EP) .................................... 21184722

(51) Int. Cl.
*E05B 63/04* (2006.01)
*E05B 63/06* (2006.01)
(Continued)

(52) U.S. Cl.
CPC ............ *E05B 63/06* (2013.01); *E05B 63/044* (2013.01); *E05C 1/12* (2013.01); *E05B 63/08* (2013.01)

(58) Field of Classification Search
CPC ... E05B 63/04; E05B 63/044; Y10T 292/1097
See application file for complete search history.

(56) References Cited

U.S. PATENT DOCUMENTS 293,424 A * 2/1884 Copeland .................. E05C 1/16 292/169.21
1,634,845 A * 7/1927 Netschert ............ E05B 15/0033 292/358

(Continued)

FOREIGN PATENT DOCUMENTS

EP 0351484 A2 1/1990
EP 1118739 A1 * 7/2001 ......... E05B 63/0021

(Continued)

OTHER PUBLICATIONS

Translation of FR801348.*

*Primary Examiner* — Carlos Lugo
(74) *Attorney, Agent, or Firm* — FisherBroyles, LLP; Roger L. Browdy; Ronni S. Jillions

(57) ABSTRACT

A lock having a reversible latch bolt which includes a reversing mechanism arranged to rotate the tip with respect to the main body over 180° along the door width direction from a first angular position to a second angular position. The reversing mechanism includes a proximal portion of the tip arranged to fit inside a receiving portion of the main body such that the tip can be rotated whilst residing in the receiving portion, a second spring biased to maintain the tip in the first or second angular position, and a cam and follower assembly, wherein the relative movement of the cam and the follower upon rotation of the tip out of the first or second angular positions loads the second spring and wherein the relative movement of the cam and the follower upon rotation of the tip into the first or second angular positions unloads the second spring.

14 Claims, 17 Drawing Sheets

(51) Int. Cl.

| | |
|---|---|
| ***E05C 1/12*** | (2006.01) |
| *E05B 63/00* | (2006.01) |
| *E05B 63/08* | (2006.01) |

(56) References Cited

U.S. PATENT DOCUMENTS

| | | | | | |
|---|---|---|---|---|---|
| 2,605,126 | A * | 7/1952 | Lickteig, Jr. | E05B 63/044 | 292/244 |
| 4,852,918 | A * | 8/1989 | Allen | E05B 63/0056 | 292/DIG. 60 |
| 5,690,372 | A * | 11/1997 | Jans | E05B 63/0021 | 292/DIG. 60 |
| 8,523,249 | B2 * | 9/2013 | Hodgin | E05B 63/044 | 292/169.14 |
| 11,781,600 | B2 * | 10/2023 | Lunday | E05C 1/16 | 292/145 |

FOREIGN PATENT DOCUMENTS

| | | | | |
|---|---|---|---|---|
| EP | 2778323 | A1 | 9/2014 | |
| EP | 2915939 | A1 | 9/2015 | |
| EP | 3156564 | A1 * | 4/2017 | E05B 15/0033 |
| FR | 801348 | A * | 1/1936 | |
| FR | 1147298 | A * | 11/1957 | |
| FR | 2597539 | B1 * | 1/1992 | |
| FR | 2787491 | A1 | 6/2000 | |
| GB | 2466665 | A * | 7/2010 | E05B 59/00 |
| WO | WO-9837295 | A1 * | 8/1998 | E05B 15/0245 |
| WO | WO-2005111347 | A1 * | 11/2005 | E05B 63/16 |

* cited by examiner

LOCK HAVING A REVERSIBLE LATCH BOLT

TECHNICAL FIELD

The present invention relates to a lock having a reversible latch bolt. The locks according to the present invention are locks suitable for locking doors, windows, fence gates and similar constructions.

BACKGROUND OF THE INVENTION

It is desired to provide a lock having a reversible latch bolt. This type of lock has the advantage that the same lock can be used for different kinds of installment situations, for example the same lock can be used for a left or right turning door. Locks having a reversible latch bolt are known in the state of the art such as from patent publication EP2915939. Such a lock has a frame comprising a base plate and a side plate. The side plate is substantially perpendicular to the base plate and defines an inner side and an outer side. The inner side which is at least delimited by the base plate and the side plate, forms the inside of the lock which is difficult to reach when the lock is installed. A latch bolt extends along a door width direction, i.e. the length direction of the latch bolt, through a latch bolt opening in the side plate. The side plate is perpendicular to said door width direction. The latch bolt is movably mounted on the frame along the door width direction between a locking and an unlocking position i.e. respectively a position wherein the latch bolt substantially extends into the outer side of the side plate and a position wherein the latch bolt is substantially retracted within the inner side of the side plate. The latch bolt comprises a main body and a tip connected to the main body. The main body and the tip are aligned along the door width direction. The tip is a substantially cylindrical element comprising a distal portion having a beveled ending configured for impacting on a lock striker. On the outer surface of the latch bolt, the transition between the main body and the tip is on the outer side of the side plate, in particular when the latch bolt is in the locking position, preferably when the latch bolt is in the locking position and when it is in the unlocking position. A first spring is arranged on the frame to bias the latch bolt into the locking position by acting on the main body. The first spring is a spiral spring arranged between an abutment point on the main body and a further side plate provided on the base plate opposite to the first side plate. Furthermore, an operating mechanism is provided on the frame, the operating mechanism being arranged for acting on an abutment point of the main body for actuating the latch bolt from its locking to its unlocking position against the action of the first spring. The latch bolt of the prior art also comprises a reversing mechanism, the reversing mechanism being arranged to rotate the tip with respect to the main body over 180° along the door width direction from a first angular position to a second angular position. This known reversing mechanism comprises the following elements:

- a proximal portion of the tip opposite to the distal portion of the tip wherein the proximal portion is arranged to fit inside a receiving portion of the main body and wherein the receiving portion of the main body and the proximal portion of the tip respectively form a female and male part, and
- a couple of screws screwing the tip to the main body.

In order to reverse the tip, the couple of screws have to be unscrewed, after which the tip can be translated out of the main body along the door width direction. Once the tip is removed from the main body, the tip can be rotated over 180° along the door width direction and re-inserted into the main body. Subsequently the couple of screws are screwed into the main body and the tip such as to fix the tip with respect to the main body.

It has however been found by the present inventors that the reversal process in the prior art is prone to disadvantages. First of all, the lock of the prior art has the disadvantage that the entire lock has to be removed from the door leaf in order to perform the reversal process. Indeed, in the prior art, the distal ending of the tip, i.e. there where the couple of screws are provided, is always retracted inside of the post of the door leaf to which the lock is attached. The user can thus not access the screws without first removing the entire lock. Second of all, once the lock is removed, the screws have to be removed which requires time, specific tools and which increases the risk of losing one of the screws.

Other locks are known having different types of reversing mechanisms, as for example described in patent publication EP2778323. However this lock comprises a latch bolt comprising a main body and a tip connected to the main body wherein on the outer surface of the latch bolt, the transition between the main body and the tip is on the inner side of the side plate. In these kinds of locks the frame can be used to support the reversing mechanism. The present inventors have however found that dedicating space on the inner side of the side plate to a reversing mechanism is not desired, in particular because this space is better used for other lock components. The inventors have further found that providing the reversing mechanism of EP2778323 on the outer side of the side plate is not possible without modification. After all the reversing mechanism of EP2778323 requires to be attached to some attachment location surrounding the latch bolt, whilst on the outer side of the side plate, there is no such attachment location available. The inventors are thus specifically looking to improve on locks, such as the ones of EP2915939, having a reversible latch bolt wherein the reversing mechanism and the transition between the main body and the tip, is on the outer side of the side plate.

DESCRIPTION OF THE INVENTION

The present invention is aimed at providing a lock having a reversible latch bolt such as the lock described in patent publication EP2915939, wherein the adaptation of the lock to the installment situation is simplified.

To that end, the present invention provides a lock according to claim 1. The lock has a frame comprising a base plate and a side plate. In some embodiments, the base plate comprises a follower opening for receiving a handle shaft follower, and a key hole opening for receiving a key cylinder. The side plate is preferably substantially perpendicular to the base plate and preferably defines an inner side and an outer side. The inner side which is at least delimited by the base plate and the side plate, forms the inside of the lock which is difficult to reach when the lock is installed. A latch bolt extends along a door width direction, i.e. the length direction of the latch bolt, through a latch bolt opening in the side plate. The side plate is preferably perpendicular to said door width direction. The latch bolt is movably mounted on the frame along the door width direction between a locking and an unlocking position i.e. respectively a position wherein the latch bolt substantially extends into the outer side of the side plate and a position wherein the latch bolt is substantially retracted within the inner side of the side plate. The latch bolt comprises a main body and a tip connected to the main body. The main body and the tip are aligned along the door width direction. The tip is a substantially cylindrical element comprising a distal portion having a beveled ending configured for impacting on a lock striker. On the outer surface of the latch bolt, the transition between the main body and the tip is on the outer side of the side plate, in particular when the latch bolt is in the locking position, preferably when the latch bolt is in the locking position and when it is in the unlocking position. A first spring is arranged on the frame to bias the latch bolt into the locking position by acting on the main body. The first spring is preferably a spiral spring arranged between an abutment point on the main body and a further side plate provided on the base plate opposite to the first side plate. Furthermore, an operating mechanism is provided on the frame, the operating mechanism being arranged for acting on the main body, for example on an abutment point on the main body, for actuating the latch bolt from its locking to its unlocking position against the action of the first spring. The latch bolt comprises a reversing mechanism, the reversing mechanism being arranged to rotate the tip with respect to the main body over 180° along the door width direction from a first angular position to a second angular position. Preferably, in the first and second angular positions, the free edge of the tip formed by the ending of the beveled ending lies substantially perpendicular to the door width direction and the door thickness direction, the latter direction preferably being substantially perpendicular to the base plate of the frame. This reversing mechanism comprises the following elements:

- a proximal portion of the tip opposite to the distal portion of the tip wherein the proximal portion is arranged to fit inside a receiving portion of the main body and wherein the receiving portion of the main body and the proximal portion of the tip respectively form a female and male cylindrical part such that the tip can be rotated between the first and second angular positions whilst residing in the receiving portion of the main body,
- a second spring, biased to maintain the tip in the first or second angular position when the tip is respectively in the first or second angular position, and
- a cam and follower assembly, wherein the tip comprises the cam. The cam is arranged to cooperate with the follower upon rotation of the tip between the first and second angular position. The relative movement of the cam and the follower upon rotation of the tip out of the first or second angular positions loads the second spring. The relative movement of the cam and the follower upon rotation of the tip into the first or second angular positions unloads the second spring. The present invention has two main implementations:
  - a) a first implementation known as “alternative a”, wherein the cam and follower assembly is arranged to translate the tip with respect to the main body along the door width direction upon rotation of the tip with respect to the main body along the door width direction and wherein said translation loads or unloads the second spring. In is to be understood that upon rotation of the tip, the main body is substantially immovable with respect to the frame 15 (for example with respect to the side plate). The translation of the tip with respect to the main body along the door width direction thus comprises a translation of the tip with respect to a substantially immobile main body. In this first implementation, the main body is thus provided with the follower even though it is held immobile, because it causes the relative movement of 20 the tip with respect to the main body.
  - b) a second implementation known as “alternative b”, wherein the second spring comprises the follower and the rotation of the tip with respect to the main body along the door width direction loads or unloads the second spring without translating the tip with respect to the main body along the door width direction.

The lock of the present invention thus solves the above mentioned problem in the state of the art by providing a novel reversing mechanism on the outer side of the side plate, inside of the latch bolt itself, the novel reversing mechanism being a cam-and follower based mechanism wherein a second spring is provided substantially within the latch bolt as opposed to over the outer surface of the latch bolt. The latch bolt can be easily reversed by merely rotating the tip whilst holding the main body. There is thus no need to remove, and a consecutive risk of losing, loose parts such as screws.

According to an embodiment of the present invention, the spring constant of the first spring is substantially lower than the spring constant of the second spring. The ratio of spring constants of the second spring to the first spring is preferably between 2 and 20, more preferably between 5 and 15, more preferably between 8 and 12, for example substantially 10. According to an embodiment, the first spring and second spring are pre-tensioned, i.e. respectively when the latch bolt is in the locking position and when the tip is in the first or second angular position, wherein the ratio of the level of pre-tension in the second spring to the level of pre-tension in the first spring is between 2 and 5, preferably between 2 and 4, for example substantially 3. These embodiments have the advantage that the latch bolt remains easily retractable against the first spring, for example by means of a user operated handle, because the first spring is rather loose. It has the further advantage that the tip does not rotate between the first and second angular positions in an unsolicited manner, as this requires loading of the rather stiff second spring. According to an embodiment of the present invention, the spring constant of the first spring is between 0.5 and 1.5 N/mm, for example 1 N/mm. Preferably the spring constant of the second spring is between 5 and 15 N/mm, for example 10 N/mm. Preferably the level of pre-tension of the first spring is between 5 and 15 N, for example 7 N. Preferably the level of pre-tension of the second spring is between 15 and 25 N, for example 20 N.

According to an embodiment of the present invention, the abutment points on the main body of the latch bolt are formed by one or more abutment pins, wherein the first spring and the operation mechanism abut on the same or different of the abutment pins. According to an embodiment, the operating mechanism comprises a handle shaft follower inserted in the follower opening in the base plate, wherein the handle shaft follower connects to a latch bolt lever abutting on an abutment pin such that the rotation of the handle shaft follower upon rotation of a handle shaft rotates the latch bolt lever such as to translate the abutment pin and thus the main body along the door width direction against the action of the first spring.

According to an embodiment of the present invention, the further side plate provided on the base plate opposite to the first side plate (on which the first spring abuts) comprises a further latch bolt opening through which the latch bolt extends when the latch bolt is in either one of the locking or unlocking position. This embodiment prevents that the moment, which is exerted on the latch bolt when impacting on the lock striker, would be fully absorbed by the single side plate.

According to an embodiment of the present invention, the main body of the latch bolt is a hollow tube, for example formed from a bended plate as described below. The main body comprises a retention element fixed within the hollow tube such as to delimit the receiving portion of the main body along the door width direction i.e. to delimit the insertion depth of the tip into the main body along the door width direction. The retention element is preferably inserted into lateral holes provided in the walls of the hollow tube of the main body. The retention element comprises a bolt opening. A bolt, having a bolt head and a screw threaded portion extending between the bolt head and a free end of the bolt, is inserted in a channel extending along the door width direction through at least a portion of the tip, through a portion of the main body and through the bolt opening in the retention element. The bolt head resides in one of the main body or the tip, and the free end of the bolt resides in the other one of the main body or the tip. The latch bolt further comprises fixing means arranged to substantially prevent the movement of the bolt along the door width direction with respect to the retention element, for example such as to avoid the accidental removal of the bolt from the latch bolt. According to an embodiment, the hollow tube of the main body has a different shape at the end comprising the receiving portion with respect to the remainder of the hollow tube. The shape of the hollow tube is preferably substantially cylindrical at the end comprising the receiving portion whilst it is preferably substantially beam-shaped for the remainder of the main body. The transition of the shape preferably occurs remote from the receiving portion and the retention element. The transition is preferably positioned such that an element of the bolt is clamped between the retention element on the one hand and the shape transition on the other hand. This element of the bolt is either the bolt head or a fixation element such as a nut fixed to the threaded portion of the bolt. In an embodiment, the fixing means comprise this element of the bolt. Indeed, by providing this element in the space between the retention element and the shape transition, the bolt is no longer able to translate along the door width direction.

According to an embodiment of the present invention, the channel extends along the door width direction through a portion of the tip, through at least a portion of the main body, through the bolt opening in the retention element, and wherein the bolt head resides in the main body, and wherein the free end of the bolt resides in the tip. According to an alternative embodiment of the present invention, the channel extends along the door width direction from an opening in the beveled ending in the distal portion of the tip, through the tip, through at least a portion of the main body, through the bolt opening in the retention element, wherein the bolt head resides in the tip such as to be accessible through the opening of the channel in the beveled end of the tip, and wherein the free end of the bolt resides in the main body. Preferably, according to the alternative embodiment, the latch bolt comprises a length adjustment mechanism arranged to adjust the distance along the door width direction that the latch bolt extends from the latch bolt opening when the latch bolt is in the locking position, wherein the length adjusting mechanism comprises the following elements:

- a pin holder slideably arranged within the main body, wherein the pin holder holds one or more of the aforementioned abutment pins on which the first spring and the operating mechanism abut, wherein the pin holder is slideably arranged between a close position and a far position in which the pin holder is respectively closer and more remote from the tip, and wherein preferably the full rotation of the pin holder with respect to the main body hollow tube along the door width direction is not possible for example because one or more abutment pins extend through an opening provided in the hollow tube wall,
- the bolt arranged as an adjustment bolt, the free end of the adjustment bolt being received in a screw hole provided in the pin holder, and
- wherein the rotation of the adjustment bolt along its axis in the door width direction results in the screwing of the adjustment bolt in or out of the pin holder which results in the sliding of the pin holder respectively towards the close or far position. This sliding is the result from the fact that the adjustment bolt cannot translate along the door width direction due to the fixing means, and because the pin holder cannot rotate along the door width direction with respect to the hollow tube.

Providing the length adjustment mechanism results in a lock having a reversible and length adjustable latch bolt. This type of lock has the advantage that the same lock can be used for different kinds of installment situations, for example the same lock can be used for a left or right turning door, and for example for situations wherein the distance between the door leaf and the door frame is not yet known upon purchase of the lock.

According to an embodiment of the present invention, one or more of the abutment pins protrude radially out of the main body through an opening provided in the walls of the main body. In embodiments wherein the length adjusting mechanism is provided, the opening is preferably a slot. The slot is elongated substantially along the door width direction such as to allow translation of the pin holder.

According to an embodiment of the present invention, the first spring and/or the latch bolt lever preferably abut on the protruding part of their respective abutment pins when their respective abutment pin protrudes out of the main tube, but alternatively the main body could be provided with a further slot through which the latch bolt lever enters the hollow tube such as to abut on its abutment pin. This latter slot is also elongated along the door width direction such as to allow the movement of the latch bolt lever for translating the pin holder. The latter slot is preferably the slot formed between the edges of a bended plate from which the hollow tube is formed, as will be described in further detail below. According to an embodiment of the present invention the abutment pin on which the first spring abuts is the same abutment pin on which the latch bolt lever abuts.

According to an embodiment of the present invention, the base plate further comprises a key cylinder opening for receiving a key cylinder. Furthermore, the side plate further comprises a dead bolt opening for receiving a dead bolt. According to the present embodiment, the frame has mounted thereon the following elements:

- a dead bolt extending along the door width direction through the dead bolt opening, the dead bolt being movably mounted on the frame along the door width direction between a locking and an unlocking position by means of a key cylinder. The dead bolt comprises a main body and a tip connected to the main body, wherein the main body is a hollow tube, wherein the main body and the tip are aligned along the door width direction, wherein the tip is a cylindrical element comprising a free ending arranged to enter into a corresponding dead bolt slot in a striking plate. The dead bolt tip comprises a proximal portion opposite to the distal portion wherein the proximal portion is arranged to fit inside a receiving portion of the main body of the dead bolt. The main body is preferably provided with an attachment pin, a mechanism for actuating the dead bolt upon rotation of a key in the key cylinder to move the dead bolt from its locking to its unlocking position and vice versa, wherein the mechanism for actuating the dead bolt comprises a dead bolt lever acting on the main body of the dead bolt, preferably on the attachment pin and following the rotation of the key in the key cylinder.

The dead bolt preferably comprises a dead bolt length adjustment mechanism arranged to adjust the distance along the door width direction that the dead bolt extends from the dead bolt opening when the dead bolt is in the locking position, wherein the dead bolt length adjusting mechanism comprises the following elements:

an attachment pin holder slideably arranged within the main body of the dead bolt, wherein the attachment pin holder holds the attachment pin, wherein the attachment pin holder is slideably arranged between a close position and a far position in which the attachment pin holder is respectively closer and more remote from the tip of the dead bolt, and wherein preferably the full rotation of the attachment pin holder with respect to the main body hollow tube along the door width direction is not possible for example because one or more attachment pins extend through an opening provided in the hollow tube wall, a retention element fixed within the main body of the dead bolt, the retention element delimiting the receiving portion of the main body along the door width direction, i.e. delimiting the insertion depth of the tip into the main body along the door width direction. The retention element comprises an adjustment bolt opening through which an adjustment bolt extending in the door width direction is inserted, an adjustment bolt inserted in a channel extending along the door width direction from an opening in the free ending of the tip of the dead bolt, through the tip of the dead bolt, through at least a part of the main body of the dead bolt, through the adjustment bolt opening in the retention element, and ending in a screw hole provided in the attachment pin holder, wherein the adjustment bolt extends along the door width direction from a bolt head accessible through the opening of the channel in the free end of the tip of the dead bolt up to a free end received in the screw hole of the attachment pin holder, and fixing means for substantially preventing the movement of the adjustment bolt along the door width direction with respect to the retention element such that the rotation of the adjustment bolt along its axis in the door width direction results in the screwing of the adjustment bolt in or out of the attachment pin holder which results in the sliding of the attachment pin holder respectively towards the close or far position. This sliding is the result from the fact that the adjustment bolt cannot translate along the door width direction due to the fixing means, and because the attachment pin holder cannot rotate along the door width direction with respect to the hollow tube.

It is noted that in the present embodiment, describing the dead bolt, several features have the same name as features used in the latch bolt, for example the “retention element”, because these features have substantially the same structure and/or function in the dead bolt and in the latch bolt. Whenever the feature is described in context of the dead bolt, it pertains to the dead bolt. Whenever the feature is described in context of the latch bolt, it pertains to the latch bolt. Preferably however, the latch bolt and the dead bolt are substantially the same apart from the reversing mechanism which is absent in the dead bolt and the shape of the distal end of the tip which is beveled in the latch bolt but possibly not in the dead bolt. The embodiments describing the latch bolt thus apply mutatis mutandis to the dead bolt, apart from the above mentioned differences.

According to an embodiment of the present invention, the main body of the latch bolt is formed from a plate bended along the door width direction. Preferably adjacent edges of the bended plate form a slit at the positions outside of the receiving portion and the adjacent edges form a seam in the receiving portion. In embodiments wherein a fixation element such as a nut is fixed to the bolt, the fixation element can be fixed, such as welded or clipped, to the bolt through the slit. Preferably adjacent edges of the seam are welded together at least in one point located at the receiving portion of the main body. This ensures that the moments, occurring when the tip impacts the door striker, do not deform the main body by opening up the slit. Preferably transversal openings are punched out of the plate. These transversal openings are suited for receiving and fixing the retention element. According to an embodiment, the main body of the dead bolt and the main body of the latch bolt have a substantially similar bended plate and transversal openings for receiving the retention element. According to an embodiment of the present invention, the retention element is inserted in transversal openings provided in the hollow tube walls of the main body such as to fixate the retention plate in the hollow tube of the main body.

Embodiments According to a First Implementation of the Present Invention

According to the first implementation of the present invention, the cam comprises one of at least one anchoring projection protruding along the door width direction or at least two anchoring recesses such that the anchoring recesses are arranged to receive the anchoring projection at least when the tip is in either one of the first or second angular position, preferably at most when the tip is in either one of the first or second angular positions.

Preferably, the cam is provided eccentrically on the tip, i.e. the channel through the tip runs substantially centrally through the tip, and the cam is placed on one of the sides surrounding the channel. The corresponding anchoring recesses or anchoring projections provided on the main body are by consequence also provided eccentrically on the main body.

Preferably, the anchoring projection or anchoring recess on the main body are formed by the retention element which for example delimits, for example together with the walls of the hollow tube of the main body, the anchoring recesses.

Preferably the proximal portion of the tip comprises the cam, which is for example provided on the free end of the proximal portion of the tip such that the cam extends along the door width direction from the free end of the proximal portion of the tip i.e. the cam extends inwardly in the tip if the cam comprises the anchoring recesses and outwardly if the cam comprises the anchoring projections. Alternatively, the cam is provided on the shoulder of the tip which transitions between the proximal portion of the tip and the remainder of the tip. The cam is then for example provided on the shoulder of the tip such that the cam extends along the door width direction from shoulder of the tip i.e. the cam extends inwardly in the tip if the cam comprises the anchoring recesses and outwardly if the cam comprises the anchoring projections.

As stated above, the cam preferably comprises the anchoring projection provided on the free end of the proximal portion of the tip. Preferably this means that the free end is the base of the anchoring projection, i.e. the deepest point or the valley of the projection. Preferably, the anchoring projection is made from the same material as the remainder of the tip, i.e. is integral with the remainder of the tip. In this preferred embodiment, the wording "free end of the proximal portion of the tip" is maintained to indicate the base of the anchoring projection.

As stated above, preferably the retention element delimits at least two anchoring recesses, for example exactly two anchoring recesses. The anchoring recesses are arranged to receive the anchoring projection at least when the tip is in either one of the first or second angular position, preferably at most when the tip is in either one of the first or second angular positions. In some embodiments the retention element and the walls of the hollow tube of the main body together delimit the anchoring recesses. In an embodiment, the anchoring recesses are anchoring openings, i.e. opening up all the way through the retention element along the door width direction. This latter embodiment is particularly advantageous when the fixation element such as the nut, part of the fixing means, also has anchoring projections, as will be described further below.

Preferably, the tip comprises one of two anchoring projections at opposing sides of the channel, or two anchoring recesses, and the main body comprises the other one of two anchoring projections or two anchoring recesses, arranged such that the two anchoring projections are inserted into the two anchoring recesses when the tip is in either one of the first or second angular position.

According to an embodiment of the first implementation, the at least one anchoring projection is formed by a groove applied in the proximal portion of the tip, wherein the groove is elongated substantially perpendicularly to the door width direction. Preferably the groove goes all the way through the tip along said elongation direction. The groove is applied to the real free end of the proximal portion of the tip, and forms valleys and hills wherein the hills are the anchoring projections and the valleys are the base/valley of the anchoring projection. The latter is referred to as the "free end of the proximal portion of the tip" throughout the present patent application, even though the real free end of the proximal portion of the tip prior to application of the groove corresponds to the summit of the anchoring projection after formation of the anchoring projections. The present embodiment has the advantage that the anchoring projections are easily produced. The present embodiment is particularly advantageous to create a number of anchoring projections in multiples of two, i.e. each groove creates to anchoring projections separated by valleys created by the groove. According to a further embodiment, the proximal portion of the tip has an outwardly chamfered circumferential edge. This embodiment clarifies that the "real free end of the proximal portion of the tip", as described above, is provided with an outwardly chamfered circumferential edge. According to a first implementation, the chamfered circumferential edge is applied after forming the groove. According to a second implementation, the chamfered circumferential edge is formed prior to forming the groove. In other words, prior to the application of the groove, the proximal portion of the tip can be seen as a cylinder having a curved lateral sidewall and a circular top wall, wherein the latter is the "real free end of the proximal portion of the tip". Between the curved lateral sidewall and the circular top wall is a circular edge. This circular edge is chamfered such as to form a curved transition plane between the curved lateral sidewall and the circular top wall. This transition plane is delimited by two concentric circular edges and thereby forms a circumferentially chamfered edge. The normal to the transition plane is radially outward, thereby forming an outwardly chamfered circumferential edge. After having formed the outwardly chamfered circumferential edge, the groove is formed in the "real free end of the proximal portion of the tip". This embodiment has the advantage that the anchoring projection thus obtained has two steep parts separated by a less steep part. This facilitates the rotation of the tip with respect to the main body after the anchoring projection has been lifted out of the anchoring recesses. According to a further embodiment the groove is delimited by a groove bottom wall and opposing groove sidewalls. Preferably the groove has angled walls, i.e. the angle between the bottom wall and the sidewall is a obtuse angle, preferably between 170° and 95°, preferably between 150° and 100°. Preferably, the groove is milled into the "real free end of the proximal portion of the tip". In case of a groove with angled walls, the mill comprises a chamfered bit. According to another embodiment, the anchoring projections are not formed by grooving the tip as described above, but by attaching separate anchoring projections onto the "real free end of the proximal part of the tip".

According to a further embodiment, the amount that each anchoring projection protrudes, for example from the free end of the proximal portion of the tip, in the door width direction follows a gradient, wherein the gradient comprises a steep part adjacent to a position of minimal protrusion, i.e. a base/valley, and a less steep part adjacent to the steep parts, and this independent of the manner of producing the anchoring projections, for example independent whether it is formed by providing a groove in the proximal portion of the tip or formed by applying separate anchoring projections. Preferably, the gradient comprises a steep part adjacent to both position of minimal protrusion, i.e. both bases/valleys, and a less steep part between the two steep parts, and this independent of the manner of producing the anchoring projections.

According to an embodiment of the first implementation, "alternative a" as described above applies. In these embodiments, the follower is preferably formed by the anchoring recesses i.e. by the structural features forming the anchoring recesses, and the anchoring projection has such a shape that upon rotation of the tip out of the first or second angular position, the anchoring projection is gradually lifted out of the anchoring recesses without substantially deforming the anchoring recesses. As described above, the follower moves relative to the cam (i.e. the tip which comprises the cam), however in use the follower is held immobile with respect to the frame (for example with respect to the side plate) and it is thus the cam (i.e. the tip which comprises the cam) which moves with respect to the frame. According to an embodiment the retention element comprises a primary part such as a plate like part, and further comprises an add-on part. The add-on part is attached to the primary part and the add-on part for example forms the anchoring recessions or the anchoring projections (i.e. the one that is not comprises in the cam). The add-on part is for example a bended plate folded around a fold line, wherein the fold line of the bended plate forms a ridge delimiting anchoring recessions adjacent to the ridge. Preferably, the primary part and the add-on part are made of different materials. Alternatively, the retention element comprises only a single unitary part. The present embodiments can be realized in different manners, such as:

- manner 1. In this first manner the channel extends along the door width direction from an opening in the beveled ending in the distal portion of the tip, through the tip, through at least a portion of the main body, through the bolt opening in the retention element, wherein the bolt head resides in the tip such as to be accessible through the opening of the channel in the beveled end of the tip, and wherein the free end of the bolt resides in the main body. The second spring is a compression spiral spring, wherein the second spring is arranged coaxially over the bolt between the bolt head of the bolt and an inwardly projecting collar provided in the proximal portion of the tip such as to urge the tip towards the main body. The translation of the tip in the door width direction moves the inwardly projecting collar towards or away from the bolt head such as to respectively compress or relax the second spring. The fixing means preferably comprise a fixation element fixed to the threaded portion of the bolt (for example by means of welding), and further comprises the bolt head. The fixation element is for example a nut or a clip-ring. The retention element is thus clamped, by means of/by the intermediary of the second spring and the inwardly projecting collar, between the fixation element and the free end of the proximal portion of the tip. Additionally, or alternatively, the fixation element is preferably clamped between the retention element and the shape transition of the main body such as to form the fixing means as explained above. Preferably the fixation element comprises at least one rotation hindering element such a further anchoring projection configured to be received in further anchoring recesses, for example two further anchoring recesses, formed by the retention element such as to avoid involuntary rotation of the bolt (or vice versa, i.e, wherein the rotation hindering element comprises the further anchoring recesses receiving further anchoring projections provided on the retention element).
- manner 2. In this second manner the bolt extends along the door width direction from the bolt head residing in the main body up to the free end received in a screw hole provided in the tip. The second spring is a compression spiral spring, wherein the second spring is arranged coaxially over the bolt between the bolt head of the bolt and the retention element such as to urge the tip towards the main body. The translation of the tip in the door width direction thus moves the bolt head towards or away from the retention element such as to respectively compress or relax the second spring. Preferably the fixing means comprise the bolt head, and the free end of the proximal portion of the tip. The retention element is clamped, by means of/by the intermediary of the second spring, between the bolt head and the free end of the proximal portion of the tip. Additionally, or alternatively, the bolt head is preferably clamped between the retention element and the shape transition of the main body such as to form the fixing means as explained above.

Embodiments According to a Second Implementation of the Present Invention

According to an embodiment of the second implementation, the "alternative b)" as described above applies. In this embodiment, the channel extends along the door width direction from an opening in the beveled ending in the distal portion of the tip, through the tip, through at least a portion of the main body, through the bolt opening in the retention element, wherein the bolt head resides in the tip such as to be accessible through the opening of the channel in the beveled end of the tip, and wherein the free end of the bolt resides in the main body. In the second implementation, the second spring is an element that is elastically compressible along the door width direction, wherein the second spring is arranged between the retention element and free end of the proximal portion of the tip, and wherein the shape of the cam and of the second spring are such that the rotation of the tip out of the first or second angular position compresses the second spring. In other words, the follower is formed by the second spring.

Preferably, the bolt head abuts an inwardly projecting collar provided in the proximal portion of the tip. The fixing means comprise a fixation element (as described above) fixed to the threaded portion of the bolt, and further comprises the bolt head. The retention element is clamped by means of the second spring and the inwardly projecting collar between the fixation element and the bolt head. Preferably the fixation element comprises a rotation hindering element such one or more anchoring projections, for example two anchoring projection, configured to be received in one or more anchoring recesses, for example two anchoring recesses, formed by the retention element such as to avoid involuntary rotation of the bolt (or vice versa, i.e, wherein the rotation hindering element comprises the anchoring recesses receiving anchoring projections provided on the retention element).

According to an embodiment implementation 1 as described above applies and implementation 2 as presently described applies. The retention element preferably comprises a primary part such as a plate like part, wherein an add-on part is attached to the primary part of the retention element. The add-on part is a bended plate folded around a fold line, wherein the fold line of the bended plate forms a ridge delimiting the anchoring recessions adjacent to the ridge. Preferably, the primary part and the add-on part are made of different materials. In the present embodiment, the bended plate is the second spring, the bolt head abuts an inwardly projecting collar provided in the proximal portion of the tip and the follower is formed by the bended plate. Preferably the fixing means comprise a fixation element (as described above) fixed to the threaded portion of the bolt, and further comprises the bolt head. The retention element is clamped, by means of/by the intermediary of the second spring and the inwardly projecting collar, between the fixation element and the bolt head. Additionally, or alternatively, the fixation element is preferably clamped between the retention element and the shape transition of the main body such as to form the fixing means as explained above.

Embodiments According to a Third Implementation of the Present Invention

According to the third implementation of the present invention, "alternative b" as described above applies. The proximal portion of the tip comprises the cam. The second spring is a leaf spring, wherein a first leg of the leaf spring abuts on or is formed by the retention element and wherein the second leg of the leaf spring abuts on the proximal portion of the tip, such as to bias the proximal portion of the tip in a direction perpendicular to the door width direction against the wall of the main body. In this implementation, the bolt head preferably abuts an inwardly projecting collar provided in the proximal portion of the tip. The fixing means preferably comprise a fixation element (as described above) fixed to the threaded portion of the bolt, and further comprises the bolt head. The retention element is clamped, by means of/by the intermediary of the inwardly projecting collar, between the fixation element and the bolt head. Additionally, or alternatively, the bolt head is preferably clamped between the retention element and the shape transition of the main body such as to form the fixing means as explained above.

According to an embodiment of the third implementation the shape of the proximal portion of the tip is delimited by an outer contour, wherein the cross-section of the outer contour with a plane perpendicular with the door width direction forms a perimeter and wherein the cam is formed by a portion of the proximal portion of the tip adjacent to the free end thereof having a perimeter comprising two recessed portions provided at opposite sides of the channel. The second leg of the leaf spring rests on one of the recessed portions when the tip is in the first angular position and the second leg of the leaf spring rests on the other one of the recessed portions when the tip is rotated in the second angular position. In the present embodiment, the follower is formed by the second leg of the leaf spring. Preferably, the perimeter is substantially circular apart from the recessed portions. In order to rotate the tip between the first and second angular positions, the leaf second spring must be compressed. This is because the portion of the tip between the recessed portions extends more in the direction perpendicular to the door width direction than does the receded portion. Preferably, the recessed portions are substantially flat.

FIGURES

FIG. 1 shows a perspective view of a lock according to an embodiment of the present invention.

FIG. 2 shows a detailed exploded view of the a latch bolt of the lock shown in FIG. 1, according to a first embodiment.

FIG. 3 shows a side view of the assembled latch bolt shown in FIG. 2.

FIG. 4 shows a cross-section of the latch bolt shown in FIG. 3 along section AA.

FIG. 5 shows a more detailed view of section B indicated in FIG. 4.

FIG. 6*a* shows a perspective view of the tip shown in FIGS. 2-5 and 30-32, wherein the proximal portion of the tip is shown in detail.

FIG. 6*b* shows a top view of the tip of FIG. 6*a*.

FIG. 7 shows a perspective view of the nut shown in FIGS. 2-5 and 30-32.

FIG. 8 shows a detailed exploded view of an alternative implementation of the latch bolt shown in FIGS. 2-5 and 30-32.

FIG. 9 shows a cross-section of the latch bolt shown in FIG. 8 along a plane perpendicular to the door width direction.

FIG. 10 shows a detailed exploded view of the a dead bolt of the lock shown in FIG. 1, having a similar construction as the latch bolt shown in FIGS. 2-5 and 30-32.

FIG. 11 shows a side view of the assembled dead bolt shown in FIG. 10.

FIG. 12 shows a cross-section of the dead bolt shown in FIG. 11 along section AA.

FIG. 13 shows a more detailed view of section B indicated in FIG. 12.

FIG. 14 shows the lock of FIG. 1 in partial cross-section, wherein the latch bolt is the latch bolt shown in FIGS. 2-5 and 30-32, and wherein the dead bolt is the dead bolt shown in FIGS. 10-14.

FIG. 15 shows a detailed exploded view of the a latch bolt of the lock shown in FIG. 1, according to a second embodiment.

FIG. 16 shows a side view of the assembled latch bolt shown in FIG. 15.

FIG. 17 shows a cross-section of the latch bolt shown in FIG. 16 along section AA.

FIG. 18 shows a more detailed view of section B indicated in FIG. 17.

FIG. 19 shows a detailed exploded view of the a dead bolt of the lock shown in FIG. 1, having a similar construction as the latch bolt shown in FIGS. 15-18.

FIG. 20 shows a side view of the assembled dead bolt shown in FIG. 19.

FIG. 21 shows a cross-section of the dead bolt shown in FIG. 11 along section AA.

FIG. 22 shows a more detailed view of section B indicated in FIG. 12.

FIG. 23 shows the lock of FIG. 1 in partial cross-section, wherein the latch bolt is the latch bolt shown in FIGS. 15-18 and wherein the dead bolt is the dead bolt shown in FIGS. 19-23.

FIG. 24 shows a detailed exploded view of the a latch bolt of the lock shown in FIG. 1, according to a third embodiment.

FIG. 25 shows a detail of a cross-section of the latch bolt shown in FIG. 24 along a plane perpendicular to the door width direction.

FIG. 26 shows a detailed exploded view of the a latch bolt of the lock shown in FIG. 1, according to a fourth embodiment.

FIG. 27 shows a side view of the assembled latch bolt shown in FIG. 26.

FIG. 28 shows a cross-section of the latch bolt shown in FIG. 27 along section AA.

FIG. 29 shows a more detailed view of section B indicated in FIG. 28.

FIG. 30 shows a side view of the assembled latch bolt shown in FIG. 2 with the tip being rotated 90° with respect to the main body, in which the side view has been rotated 90° when comparing to similar FIG. 3.

FIG. 31 shows a cross-section of the latch bolt shown in FIG. 30 along section AA.

FIG. 32 shows a more detailed view of rectangular section indicated in FIG. 31.

Figure 1:
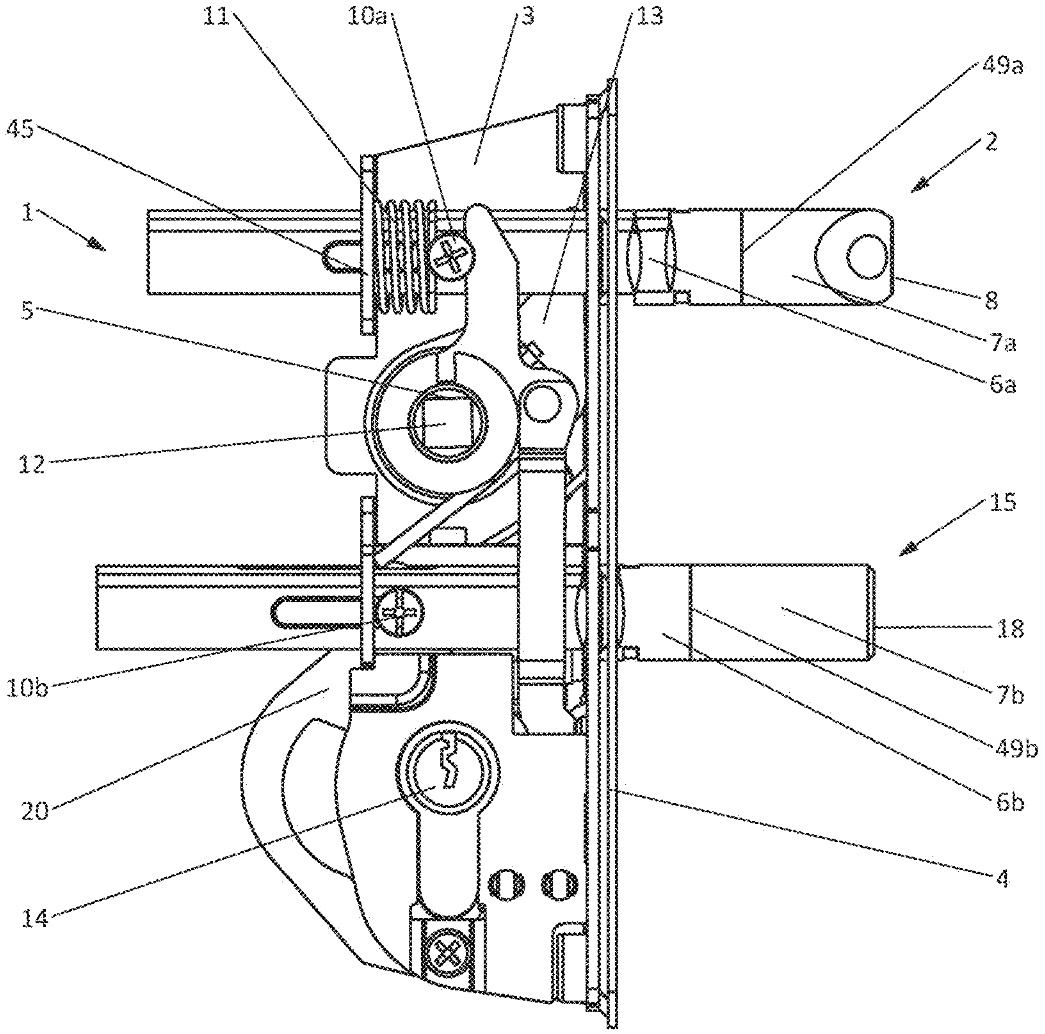
FIG. 1 shows a perspective view of a lock 1 according to an embodiment of the present invention. The lock 1 has a reversible and length adjustable latch bolt 2, the lock 1 comprising a frame comprising a base plate 3 and a side plate 4. The base plate 3 comprises a follower opening for receiving a handle shaft follower 5 as well as a key cylinder opening for receiving a key cylinder 14. The side plate 4 comprises a latch bolt opening for receiving a latch bolt 2 as well as a dead bolt opening for receiving a dead bolt 15. The frame has mounted thereon the following elements.
Figure 2:
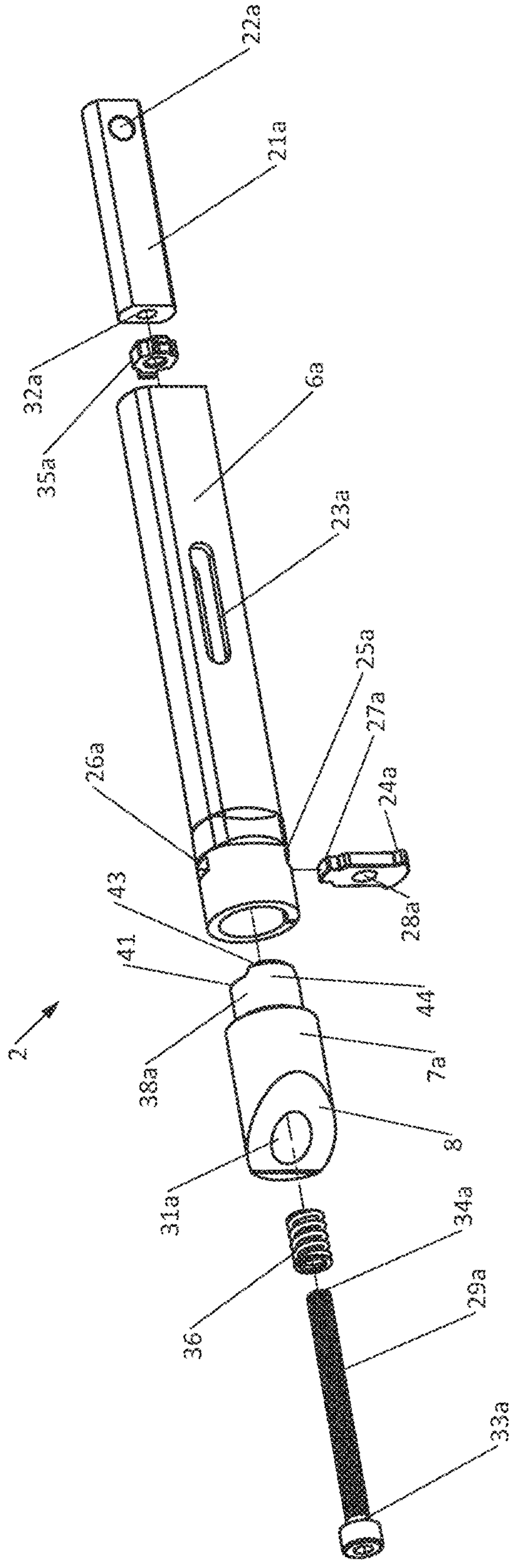

- a latch bolt 2 extending along a door width direction, i.e. the elongation direction of the latch bolt 2, through the latch bolt opening. The latch bolt is movably mounted on the frame along the door width direction between a locking and an unlocking position by means of a handle (not shown). The latch bolt 2 comprises a main body 6*a* and a tip 7*a* connected to the main body 6*a*. The main body 6*a* is formed by bending a plate and punching out transversal openings 26*a* (not shown in FIG. 1). The tip 7*a* is formed by milling out a solid piece of metal. On the outer surface of the latch bolt 2, the transition 49*a* between the main body 6*a* and the tip 7*a* is on the outer side of the side plate 4. The main body 6*a* is a hollow substantially beam-shaped tube, formed by a bended plate. The main body and tip 6*a*, 7*a* are aligned along the door width direction. The tip 7*a* is a substantially cylindrically shaped object comprising a distal portion having a beveled ending 8 configured for impacting on a lock striker for example a door lock striker provided on the frame of a door. The main body 6*a* is provided with an abutment pin 10*a* which is a screw, a first spring 11 arranged to bias the latch bolt 2 into the locking position by abutting on the abutment pin 10*a* and on a second side plate 45 opposite to the first side plate 4, a handle shaft follower 5 provided in the follower opening. The handle shaft follower 5 comprising a handle shaft channel 12 extending along an axis in a door thickness direction for receiving a handle shaft (not shown) for said handle. The door thickness direction is substantially perpendicular to the door width direction. The handle shaft follower 5 is pivotally mounted around its axis in the door thickness direction on the frame between a first and a second angular position, such that in use the handle shaft follower 5 rotates between the first and the second angular position upon rotation of the handle shaft between the first and the second angular position, and an operating mechanism 13 for actuating the latch bolt 2 against the action of the first spring 11 upon rotation of the handle shaft follower 5 to move the latch bolt 2 from its locking to its unlocking position against the action of the first spring 11 when the handle shaft follower is rotated from its first angular position to its second angular position and to move the latch bolt 2 from its unlocking to its locking position assisted by the action of the first spring 11 when the handle shaft follower 5 is rotated from its second angular position to its first angular position. The operating mechanism 13 for actuating the latch bolt comprises a latch bolt lever abutting the abutment pin 10*a* and following the rotation of the handle shaft follower 5.

a dead bolt 15 extending along the door width direction through the dead bolt opening, the dead bolt being movably mounted on the frame along the door width direction between a locking and an unlocking position by means of a key cylinder 14. The dead bolt 15 comprises a main body 6*b* and a tip 7*b* connected to the main body 6*b*. The main body 6*b* is formed by bending a plate and punching out transversal openings 26*b* (not shown in FIG. 1). The tip 7*b* is formed by milling out a solid piece of metal. The main body 6*b* is a hollow substantially beam shaped tube. The main body and tip 6*b*, 7*b* are aligned along the door width direction. On the outer surface of the dead bolt 15, the transition 49*b* between the main body 6*b* and the tip 7*b* is on the outer side of the side plate 4. The tip 7*b* is a substantially cylindrical object comprises a free ending 18 arranged to enter into a corresponding dead bolt slot in a striking plate. The main body 6*b* is provided with an attachment pin 10*b*.

an operating mechanism 20 for actuating the dead bolt 15 upon rotation of a key in the key cylinder 14 to move the dead bolt 15 from its locking to its unlocking position and vice versa, wherein the mechanism 20 for actuating the dead bolt comprises a dead bolt lever attached on the attachment pin 10*b* and following the rotation of the key in the key cylinder 14.

The above mentioned features of the lock correspond to the lock presented in the prior art publication EP2915939. Details of these common features of the lock, such as to provision of a second turn lever coupled to the key cylinder, can be found in said patent publication which is therefore incorporated by reference into the present patent application.

The latch bolt 2 comprises a reversing mechanism, the reversing mechanism being arranged to rotate the tip 7 with respect to the main body over 180° along the door width direction from a first angular position to a second angular position. This reversing mechanism comprises the following elements:

a proximal portion 38*a* (not shown in FIG. 1) of the tip 7*a* opposite to the distal portion of the tip wherein the proximal portion 38*a* is arranged to fit inside a receiving portion of the main body 6 and wherein the receiving portion of the main body 6*a* and the proximal portion 38*a* of the tip 7*a* respectively form a female and male cylindrical part such that the tip 7*a* can be rotated between the first and second angular positions whilst residing in the receiving portion of the main body 6*a*, a second spring 36 (not shown in FIG. 1), biased to maintain the tip 7*a* in the first or second angular position when the tip is respectively in the first or second angular position, and a cam and follower assembly, wherein the proximal portion 38*a* of the tip 7*a* comprises the cam. The cam is arranged to cooperate with the follower upon rotation of the tip 7*a* between the first and second angular position. The relative movement of the cam and the follower upon rotation of the tip out of the first or second angular positions loads the second spring 36. The relative movement of the cam and the follower upon rotation of the tip 7*a* into the first or second angular positions unloads the second spring 36. The present invention has two main implementations:

a) a first implementation known as “alternative a”, wherein the cam and follower assembly is arranged to translate the tip 7*a* with respect to the main body 6*a* along the door width direction upon rotation of the tip 7*a* with respect to the main body 6*a* along the door width direction and wherein said translation loads or unloads the second spring 36. Embodiments showing a latch bolt according to “alternative a” are shown in FIGS. 2-7 and 30-32, 8-9 or 15-18 respectively corresponding to the “first embodiment”, “an alternative implementation of the first embodiment” and the “second embodiment” will be described further below.

b) a second implementation known as “alternative b”, wherein the second spring 36 comprises the follower and the rotation of the tip 7*a* with respect to the main body 6*a* along the door width direction loads or unloads the second spring 36 without translating the tip 7*a* with respect to the main body 6*a* along the door width direction. Embodiments showing a latch bolt according to “alternative b” are shown in FIG. 24-25 or 26-29 respectively corresponding to the “third embodiment”, and the “fourth embodiment” will be described further below.

In all shown embodiments the main body 6*a* of the latch bolt and the main body 6*b* of the dead bolt 15 comprises a retention element 24*a*, 24*b* fixed within the transversal openings 25*a*, 26*a*, 25*b*, 26*b* of their respective main body by means of a projection 27*a*, 27*b*. The retention element 24*a*, 24*b* delimits the receiving portion of the main body 6*a*, 6*b* along the door width direction. The retention elements 24*a*, 24*b* comprise a bolt opening 28*a*, 28*b*. A bolt 29*a*, 29*b*, having a bolt head 33*a*, 33*b* and a screw threaded portion extending between the bolt head 33*a*, 33*b* and a free end 34*a*, 34*b* of the bolt 29*a*, 29*b*, is inserted in a channel extending along the door width direction through at least a portion of the tip 7*a*, 7*b*, through a portion of the main body 6*a*, 6*b* and through the bolt opening 28*a*, 28*b* in the retention element 24*a*, 24*b*. The bolt head 33*a*, 33*b* resides in one of the main body 6*a*, 6*b* or the tip 7*a*, 7*b*, and the free end 34*a*, 34*b* of the bolt 29*a*, 29*b* resides in the other one of the main body 6*a*, 6*b* or the tip 7*a*, 7*b*. The latch bolt 2 and the dead bolt 15 further comprise fixing means arranged to substantially prevent the movement of the bolt 29*a*, 29*b* along the door width direction with respect to the retention element 24*a*, 24*b*, such as to avoid the accidental removal of the bolt 29*a*, 29*b* from the latch bolt 2 or dead bolt 15. The hollow tube of the main body 6*a*, 6*b* has a different shape at the end comprising the receiving portion with respect to the remainder of the hollow tube. The shape of the hollow tube is substantially cylindrical at the end comprising the receiving portion whilst it is substantially beam-shaped for the remainder of the main body 6*a*, 6*b*. The transition 50*a*, 50*b* of the shape occurs remote from the receiving portion and the retention element 24*a*, 24*b*.

In the embodiments shown in FIGS. 15-18 regarding the latch bolt, and shown in FIGS. 19-22 regarding the dead bolt, the channel extends along the door width direction through a portion of the tip 7*a*, 7*b*, through at least a portion of the main body 6*a*, 6*b*, through the bolt opening 28*a*, 28*b* in the retention element 24*a*, 24*b*, and the bolt head 33*a*, 33*b* resides in the main body 6*a*, 6*b*, whilst the free end 34*a*, 34*b* of the bolt 29*a*, 29*b* resides in the tip 7*a*, 7*b*.

In the embodiments shown in FIGS. 2-5 and 30-32, 8-9, 24-25 or 26-29*a* regarding the latch bolt, and shown in FIGS. 10-13 regarding the dead bolt, the channel extends along the door width direction from an opening 31*a* in the beveled ending 8 in the distal portion of the tip 7*a* for the latch bolt 2 and from an opening 31*b* in the free ending 18 in the distal portion of the tip 7*b* for the dead bolt 15, through the tip 7*a*, 7*b*, through at least a portion of the main body 6*a*, 6*b*, through the bolt opening 28*a*, 28*b* in the retention element 24*a*, 24*b*, and the bolt head 33*a*, 33*b* resides in the tip 7*a*, 7*b* such as to be accessible through the opening 31*a* of the channel in the beveled end 8 of the tip 7*a* for the latch bolt and through the opening 31*b* of the channel in the free end 18 of the tip 7*b* for the dead bolt 15, whilst the free end 34*a*, 34*b* of the bolt 29*a*, 29*b* resides in the main body 6*a*, 6*b*.

In the embodiments shown in FIGS. 2-5 and 30-32, 8-9, 24-25 or 26-29 regarding the latch bolt 2, and shown in FIGS. 10-13 regarding the dead bolt 15, the latch bolt 2 and dead bolt 15 comprises a length adjustment mechanism arranged to adjust the distance along the door width direction that respectively the latch bolt 2 and dead bolt 15 extends from respectively the latch bolt opening and dead bolt opening when respectively the latch bolt 2 and dead bolt 15 is in the locking position, wherein the length adjusting mechanism comprises the following elements:

a pin holder 21*a*, 21*b* slideably arranged within the main body 6*a*, 6*b* wherein the pin holder comprises a reception hole 22*a*, 22*b* for holding the aforementioned abutment pin 10*a*, 10*b* on which the first spring 11 and the operating mechanism 13 abut for the latch bolt 2 and on which the operating mechanism 20 abuts for the dead bolt 15. The pin holder 21*a*, 21*b* is slideably arranged between a close position and a far position in which the pin holder 21*a*, 21*b* is respectively closer and more remote from the tip 7*a*, 7*b* and wherein preferably the full rotation of the pin holder 21*a*, 21*b* with respect to the main body 6*a*, 6*b* hollow tube along the door width direction is not possible because the abutment pins 10*a*, 10*b* extend through a slot 23*a*, 23*b* provided in the hollow tube wall, the bolt 29*a*, 29*b* arranged as an adjustment bolt, the free end 34*a*, 34*b* of the adjustment bolt 29*a*, 29*b* being received in a screw hole 32*a*, 32*b* provided in the pin holder 21*a*, 21*b*, and wherein the rotation of the adjustment bolt 29*a*, 29*b* along its axis in the door width direction results in the screwing of the adjustment bolt 29*a*, 29*b* in or out of the pin holder 21*a*, 21*b* which results in the sliding of the pin holder 21*a*, 21*b* respectively towards the close or far position. This sliding is the result from the fact that the adjustment bolt 29*a*, 29*b* cannot translate along the door width direction due to the fixing means, and because the pin holder 21*a*, 21*b* cannot rotate along the door width direction with respect to the hollow tube of the main body 6*a*, 6*b*.

In the embodiments wherein the dead bolt 15 or latch bolt 2 comprises the length adjusting mechanism, the abutment pin 10*a*, 10*b* protrudes radially out of the main body 6*a*, 6*b* through a slot 23*a*, 23*b* provided in the walls of the main body 6*a*, 6*b*. The slot is elongated substantially along the door width direction such as to allow translation of the pin holder 21*a*, 21*b*. The first spring 11 and the latch bolt lever abut on the protruding part of their abutment pin 10*a* of the latch bolt. The main body 6*b* of the dead bolt 15 is provided with a further slot through which the dead bolt lever enters the hollow tube such as to abut on its abutment pin 10*b*. This latter slot is also elongated along the door width direction such as to allow the movement of the dead bolt lever for translating the pin holder 21*b*. The latter slot is the slot formed between the edges of a bended plate from which the hollow tube of the dead bolt 15 is formed.

Figure 8:
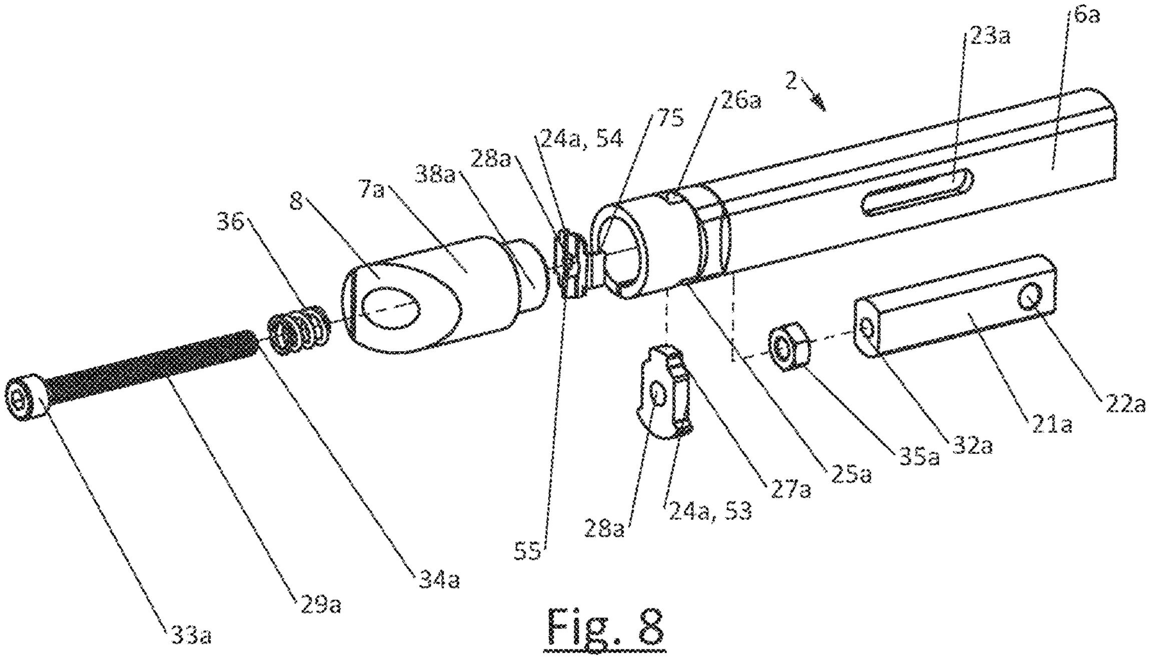
Figure 9:
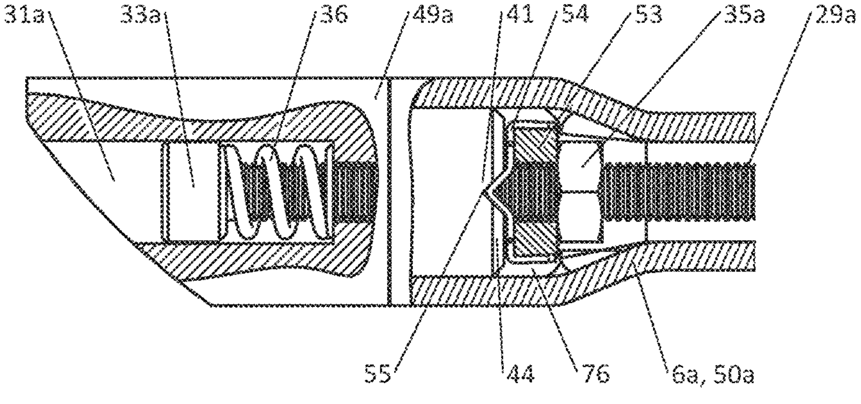
Figure 10:
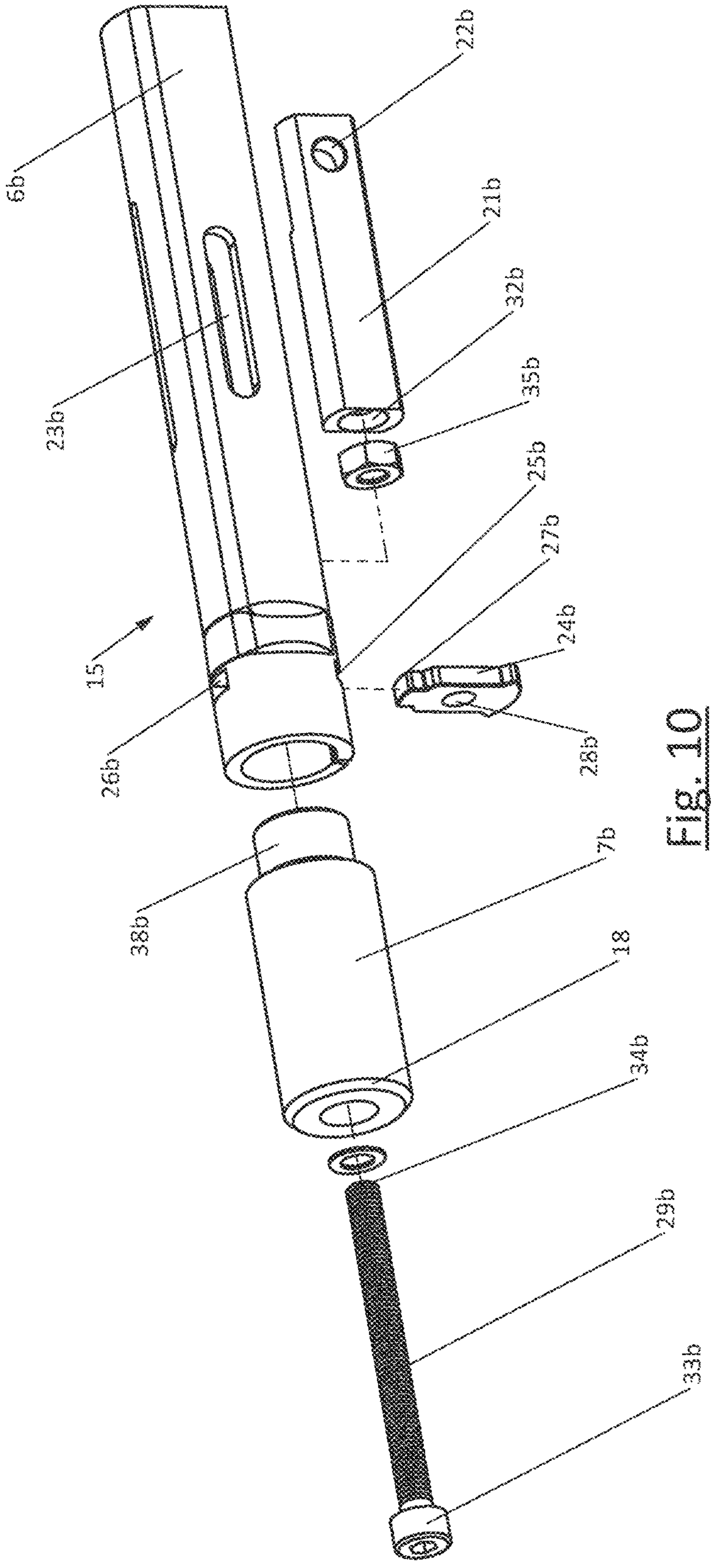
Figure 11:
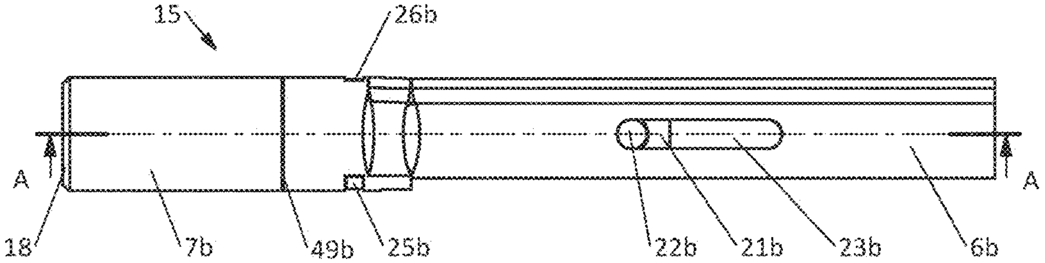
Figure 12:
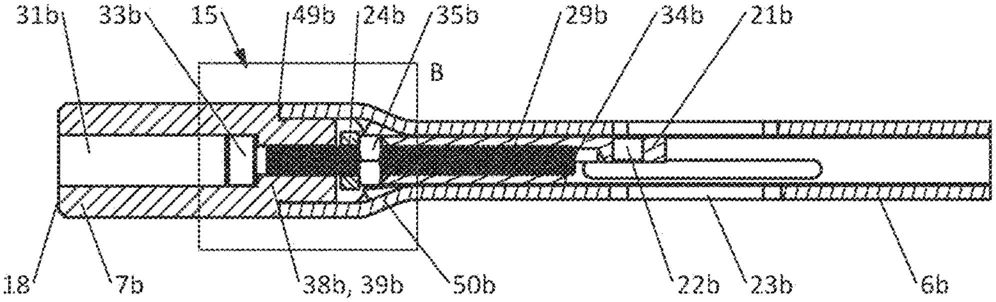
Figure 13:
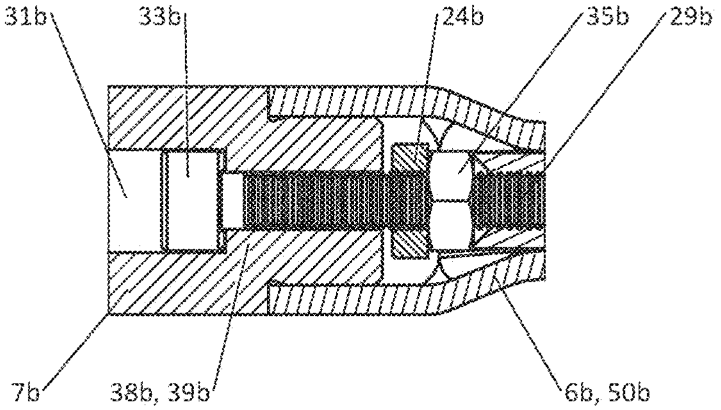

First Embodiment Shown in FIGS. 2-7 and 30-32, the Alternative Implementation of the First Embodiment Shown in FIGS. 8-9, the Second Embodiment Shown in FIGS. 15-18 and the Corresponding Dead Bolts In the first embodiment shown in FIGS. 2-7 and 30-32, the variant of the first embodiment shown in FIGS. 8-9, and the second embodiment shown in FIGS. 15-18, the cam is formed by two anchoring projections 44 provided eccentrically on the free end 41 of the proximal portion 38*a* of the tip 7 such that the anchoring projection 44 protrudes along the door width direction from the free end 41 of the proximal portion of the tip 7. The channel through the tip 7 runs substantially centrally through the tip 7, and the anchoring projections 44 are placed on opposite of the sides surrounding the channel. The channel is provided on the free end 41 of the proximal portion 38*a* of the tip 7. This means that the free end 41 is the base of the anchoring projection 44, i.e. the deepest point or the valley of the projection. The anchoring projection 44 is made from the same material as the remainder of the tip 7, i.e. is integral with the remainder of the tip.

The retention element 24*a* together with the wall of the hollow tube of the main body 6 delimits two anchoring recesses 30. The anchoring recesses 30 are arranged to receive the anchoring projection 44 at most when the tip 7 is in either one of the first or second angular position. The anchoring recesses 30 are anchoring openings, i.e. opening up all the way through the retention element 24*a* along the door width direction.

The two anchoring projections are formed by a groove applied in the proximal portion 38*a* of the tip 7*a*, wherein the groove is elongated substantially perpendicularly to the door width direction. The groove is applied to the real free end of the proximal portion of the tip 7*a*, and forms valleys and hills wherein the hills are the anchoring projections and the valleys are the base/valley 41 of the anchoring projection. The latter is referred to as the "free end of the proximal portion of the tip" throughout the present patent application, even though the real free end of the proximal portion 38*a* of the tip 7*a* prior to application of the groove corresponds to the summit 43 of the anchoring projection 44 after formation of the anchoring projections 44. As particularly shown in FIGS. 6*a* and 6*b*, the proximal portion 38*a* of the tip 7*a* has an outwardly chamfered circumferential edge 48 prior to the application of the groove. After having formed the outwardly chamfered circumferential edge, the groove is formed in the "real free end of the proximal portion of the tip". The groove is delimited by a groove bottom wall 51 and opposing groove sidewalls 52. The groove has angled walls, i.e. the angle between the bottom wall 51 and the sidewall 52 is a obtuse angle. The edge 71 thus formed delimiting the angled sided walls 52 comprises two steep parts 72 adjacent to the bottom wall 51 and an less steep intermediate part 73 between the steep parts.

In these embodiments of the latch bolt, "alternative a" as described above applies. In these embodiments, the follower is formed by the anchoring recesses 30 i.e. by the structural features forming the anchoring recesses, and the anchoring projection 44 has such a shape that upon rotation of the tip out of the first or second angular position, the anchoring projection is gradually lifted out of the anchoring recesses without substantially deforming the anchoring recesses. According to the first embodiment shown in FIGS. 2-7 and 30-32 the retention element 24*a* comprises only a single unitary part shaped as a plate like part. According to the alternative variant of the first embodiment shown in FIGS. 8-9 the retention element 24*a* comprises a primary part shaped as a plate like part 53 and an add-on part 54, wherein the add-on part 54 is attached to the primary part 53 and wherein the add-on part 54 forms the anchoring recessions 30. The add-on part 54 is a bended plate folded around a fold line 55, wherein the fold line 55 of the bended plate forms a ridge delimiting the anchoring recessions 30 adjacent to the ridge. The primary part 53 and the add-on part 54 are made of different materials. The add-on part comprises two connecting legs 75 that clips into leg recesses 76 formed by the primary part 53 of the retention element 24*a*.

Figure 3:
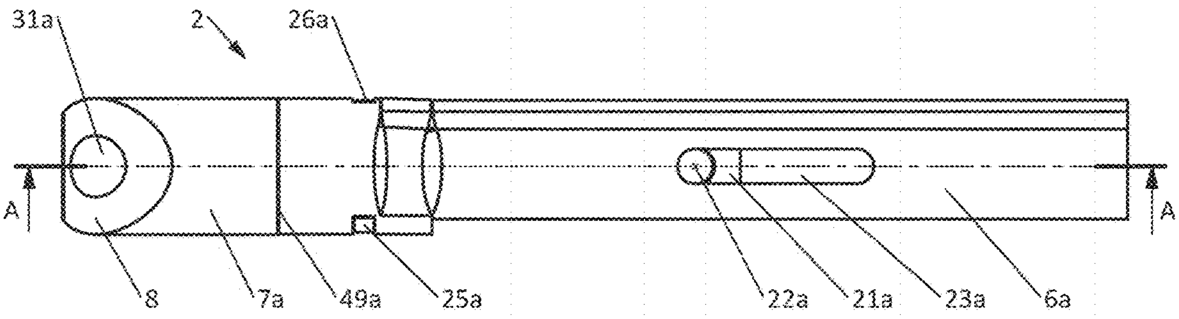
Figure 4:
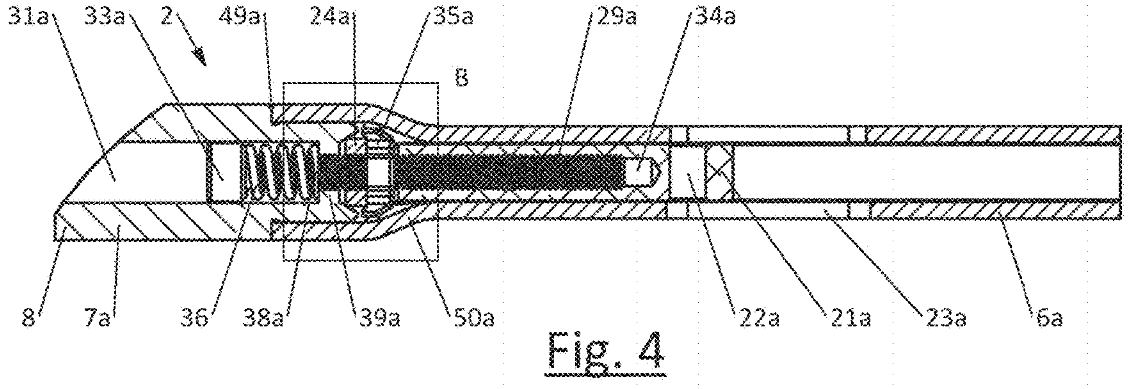
Figure 5:
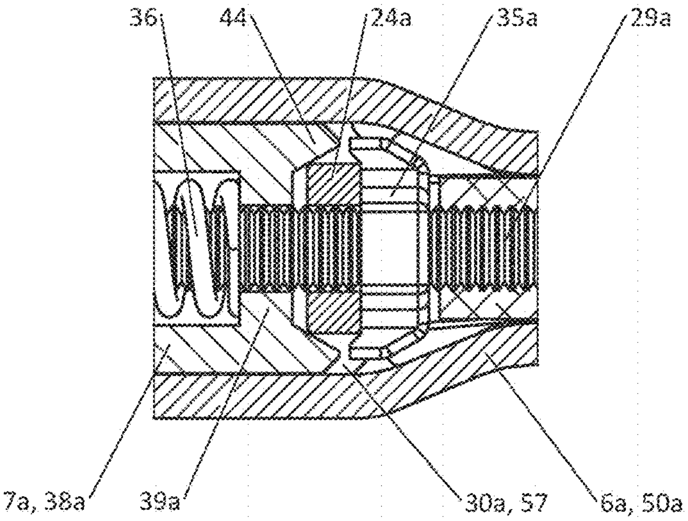
Figure 6A:
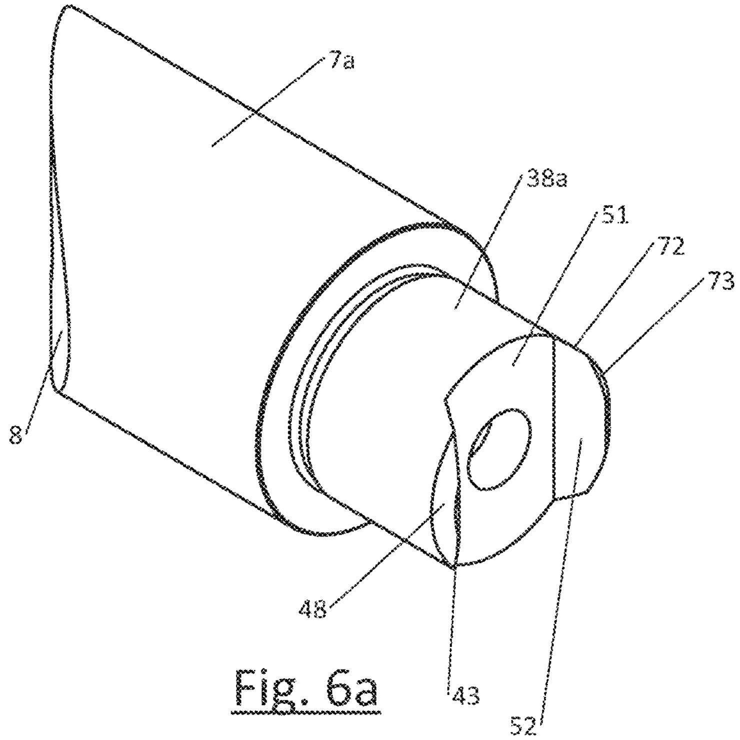
Figure 6B:
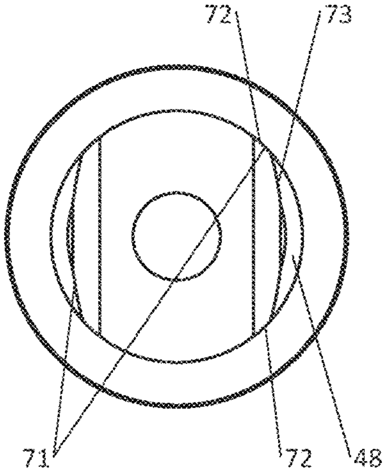
Figure 7:
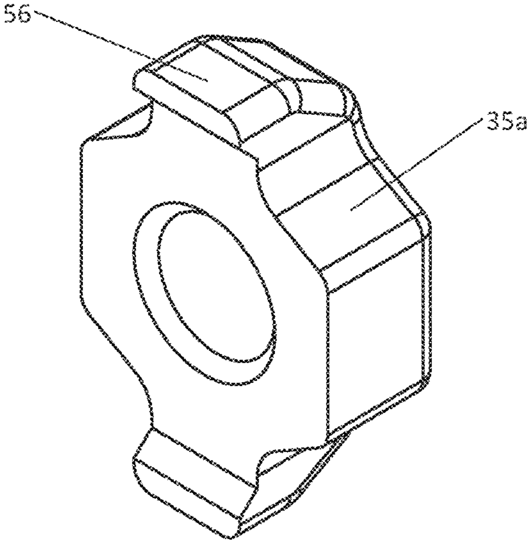
Figure 30:
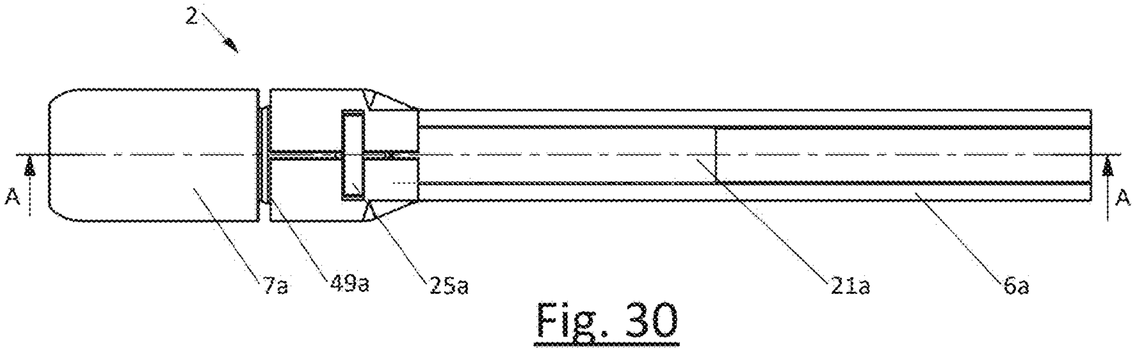
Figure 31:
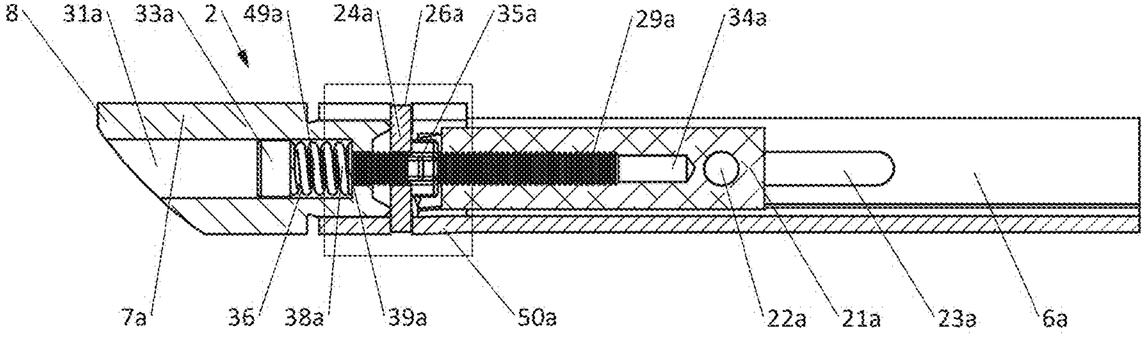
Figure 32:
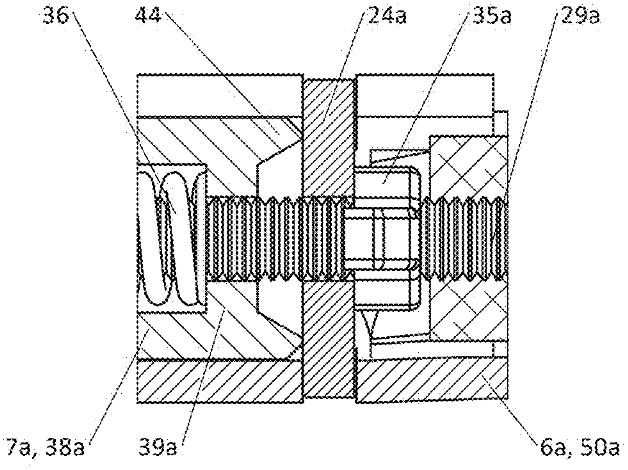

In the embodiments shown in FIGS. 2-7 and 30-32 and 8-9 the channel of the latch bolt extends along the door width direction from the opening 31*a* in the beveled ending 8 in the distal portion of the tip 7*a*, through the tip 7*a*, through at least a portion of the main body 6*a*, through the bolt opening 28*a* in the retention element 24*a*, wherein the bolt head 33*a* resides in the tip 7*a* such as to be accessible through the opening 31*a* of the channel in the beveled end 31*a* of the tip7*a*, whilst the free end 34*a* of the bolt 29*a* resides in the main body 6*a*. The second spring 36 is a compression spiral spring, wherein the second spring 36 is arranged coaxially over the bolt 29*a* between the bolt head 33*a* of the bolt 29*a* and an inwardly projecting collar 39*a* provided in the proximal portion 38*a* of the tip 7*a* such as to urge the tip 7*a* towards the main body 6*a*. The translation of the tip 7*a* in the door width direction moves the inwardly projecting collar 39*a* towards or away from the bolt head 33*a* such as to respectively compress or relax the second spring 36. FIGS. 3-5 illustrate the unloaded position of the spring 36 with the tip 7*a* directly adjacent the main body 6*a*. FIGS. 30-32 illustrate the loaded position of the spring 36 where there is a spacing between the tip a7 and the main body 6*a*. This spacing is achieved by rotating the tip 7*a* over 90° degrees thereby causing the anchoring projections 44 (with inclined faces 52 as shown in FIG. 6*a*) to be pushed away from the stationary retention element 24*a* and to engage a front surface of the retention element 24*a* as is shown in FIG. 32. The fixing means comprise a fixation element in the form of a nut 35*a* fixed to the threaded portion of the bolt 29*a*, and further comprises the bolt head 33*a*. The retention element 24*a* is thus clamped, by means of i.e. by intermediary of the second spring 36 and the inwardly projecting collar 39*a*, between the nut 35*a* and the free end of the proximal portion 38*a* of the tip 7*a*. Additionally, the nut 35*a* is clamped between the retention element 24*a* and the shape transition 50*a* of the main body 6*a* thereby forming part of the fixing means. As shown in detail in FIG. 7, the nut 35*a* comprises a rotation hindering element formed by two further anchoring projection 56 configured to be received in two further anchoring recesses 57 formed by the retention element 24*a* such as to avoid involuntary rotation of the bolt 29*a*.

Figure 14:
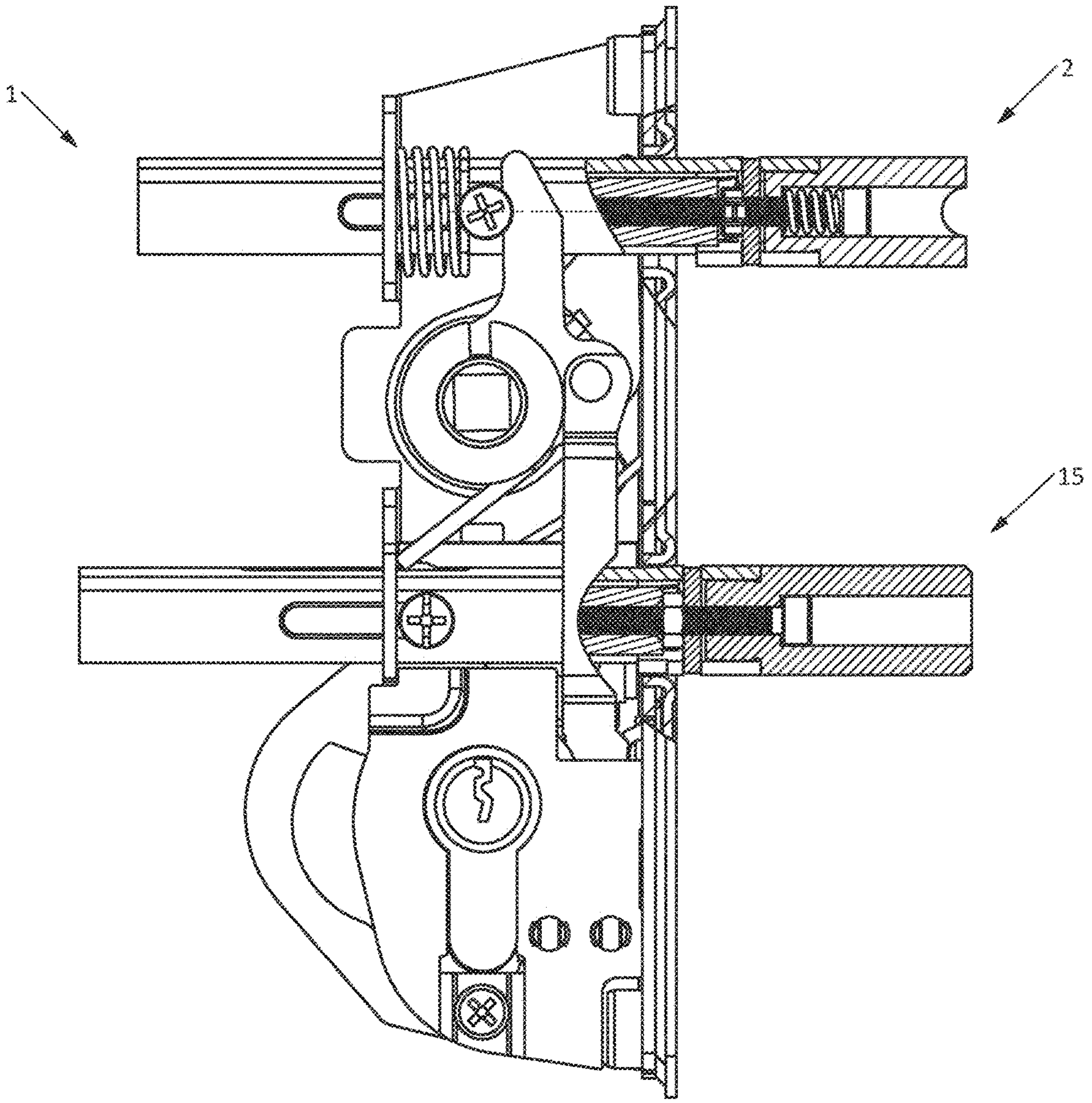
Figure 15:
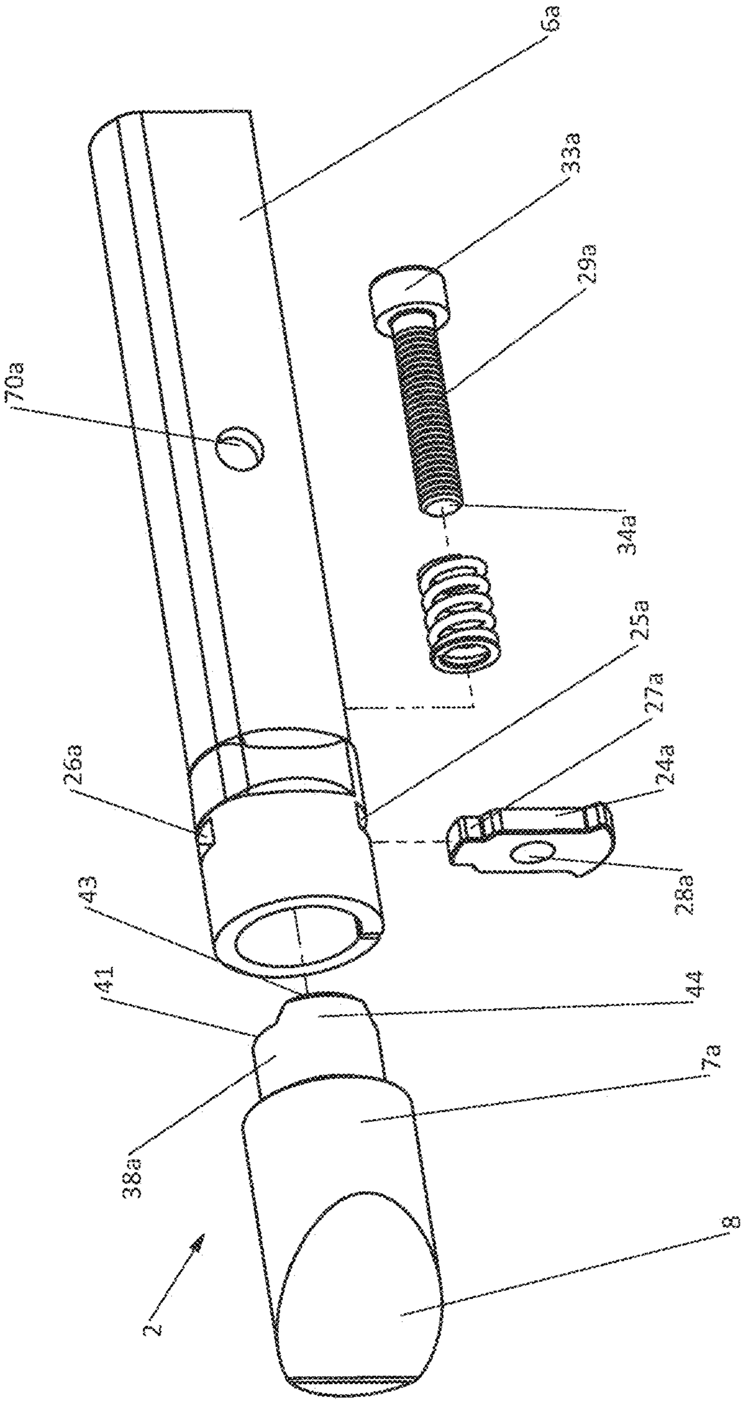
Figure 16:
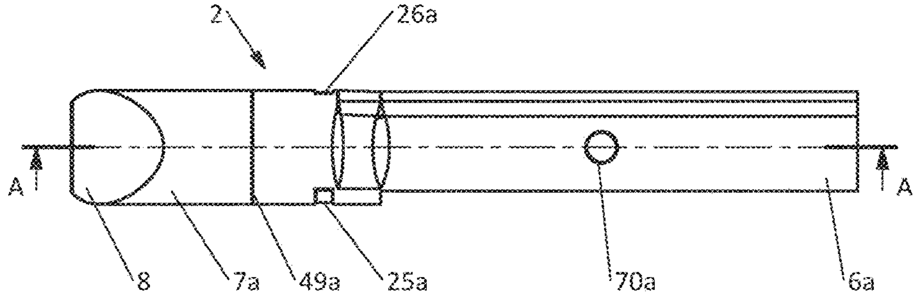
Figure 17:
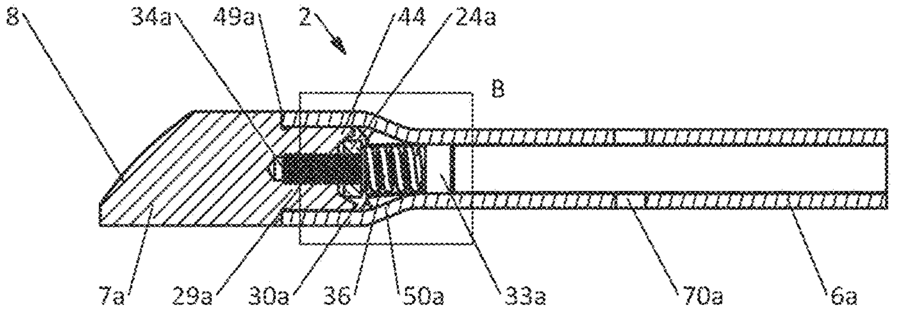
Figure 18:
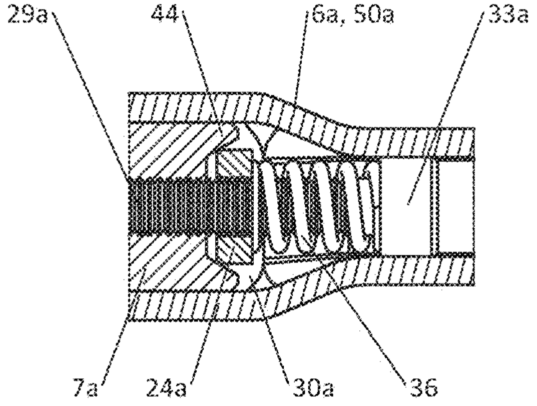
Figure 19:
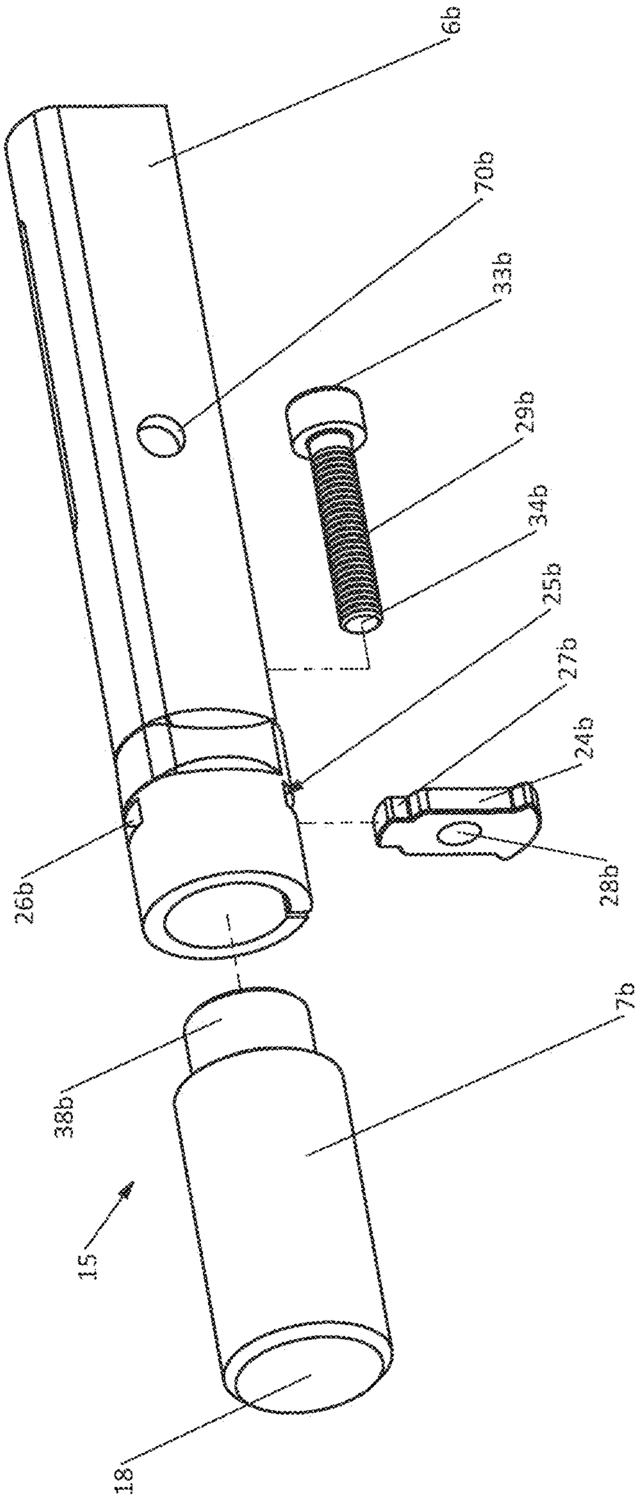
Figure 20:
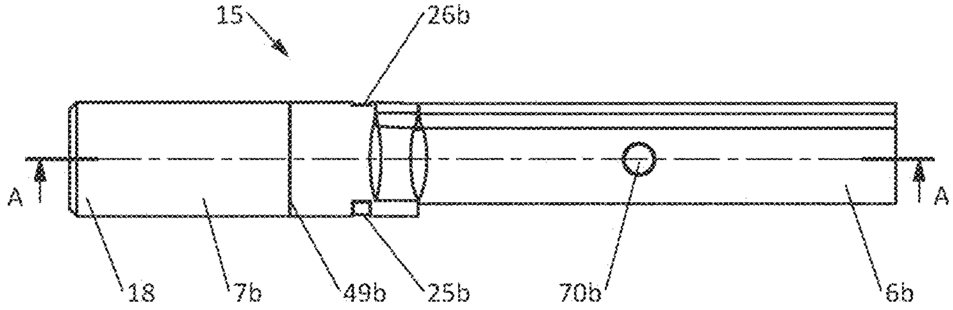
Figure 21:
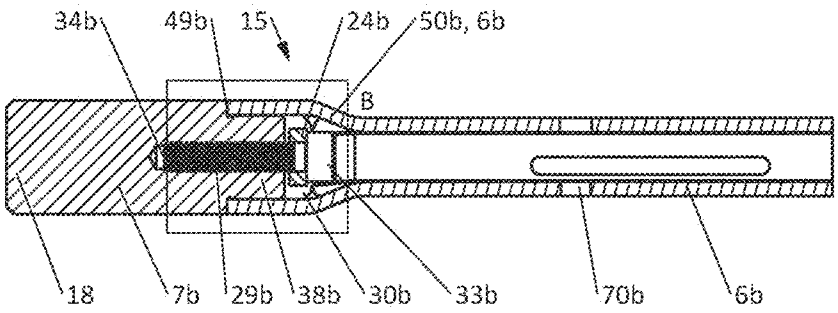
Figure 22:
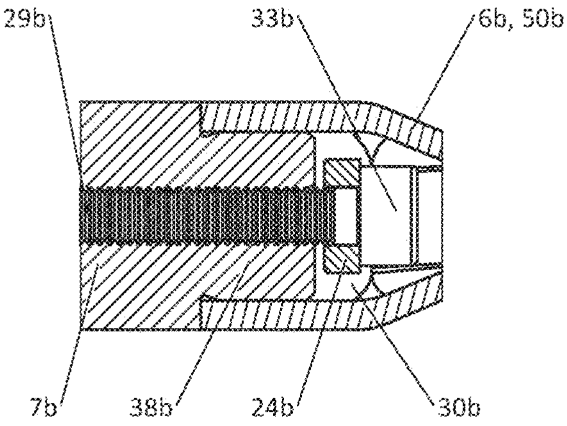

The FIGS. 10-13 show a dead bolt 15 constructed substantially similarly to the latch bolt of FIGS. 2-7 and 30-32, albeit without reversing mechanism. In the embodiments shown in FIGS. 10-13 the channel of the dead bolt 15 extends along the door width direction from the opening 31*b* in the free ending 18 in the distal portion of the tip 7*b*, through the tip 7*b*, through at least a portion of the main body 6*b*, through the bolt opening 28*b* in the retention element 24*b*, wherein the bolt head 33*b* resides in the tip 7*b* such as to be accessible through the opening 31*b* of the channel in the free end 18 of the tip7*b*, whilst the free end 34*b* of the bolt 29*b* resides in the main body 6*b*. In the dead bolt 15, there is no second spring. The fixing means comprise a nut 35*b* fixed to the threaded portion of the bolt 29*b*, and further comprises the bolt head 33*b* abutting on an inwardly projecting collar 39*b* provided in the proximal portion of the tip 7*b*. The retention element 24*a* is thus clamped by means of, i.e. by intermediary of the inwardly projection collar 39*b*, between the nut 35*b* and the free end of the proximal portion 38*b* of the tip 7*b*. Additionally, the nut 35*b* is clamped between the retention element 24*b* and the shape transition 50*b* of the main body 6*b* thereby forming part of the fixing means. The FIG. 14 shows a view of the lock similar to the view shown in FIG. 1, but wherein the latch bolt 2 and the dead bolt 15 are shown partially in cross-section to reveal the construction of the latch bolt according to the first embodiment shown in FIGS. 2-7 and 30-32 and to reveal the construction of the dead bolt according to the embodiments shown in FIGS. 10-13.

In the embodiments shown in FIGS. 15-18 the bolt 29*a* of the latch bolt 2 extends along the door width direction from the bolt head 33*a* residing in the main body 6*a* up to the free end 34*a* received in a screw hole provided in the tip 7*a*. The second spring 36 is a compression spiral spring, wherein the second spring 36 is arranged coaxially over the bolt 29*a* between the bolt head 33*a* of the bolt 29*a* and the retention element 24*a* such as to urge the tip 7*a* towards the main body 6*a*. The translation of the tip 7*a* in the door width direction thus moves the bolt head 33*a* towards or away from the retention element 24*a* such as to respectively compress or relax the second spring 36. The fixing means comprise the bolt head 33*a*, and further comprise the free end of the proximal portion 38*a* of the tip 7*a*. The retention element 24*a* is clamped, by means of i.e. by the intermediary of the second spring 36, between the bolt head 33*a* and the free end of the proximal portion 38*a* of the tip 7*a*. In these embodiments, no length adjustment mechanism is provided. Therefore, no slot 23 is provided, but merely a reception hole 70 for receiving an abutment pin on which the first spring 11 and the operating mechanism 20 abut.

Figure 23:
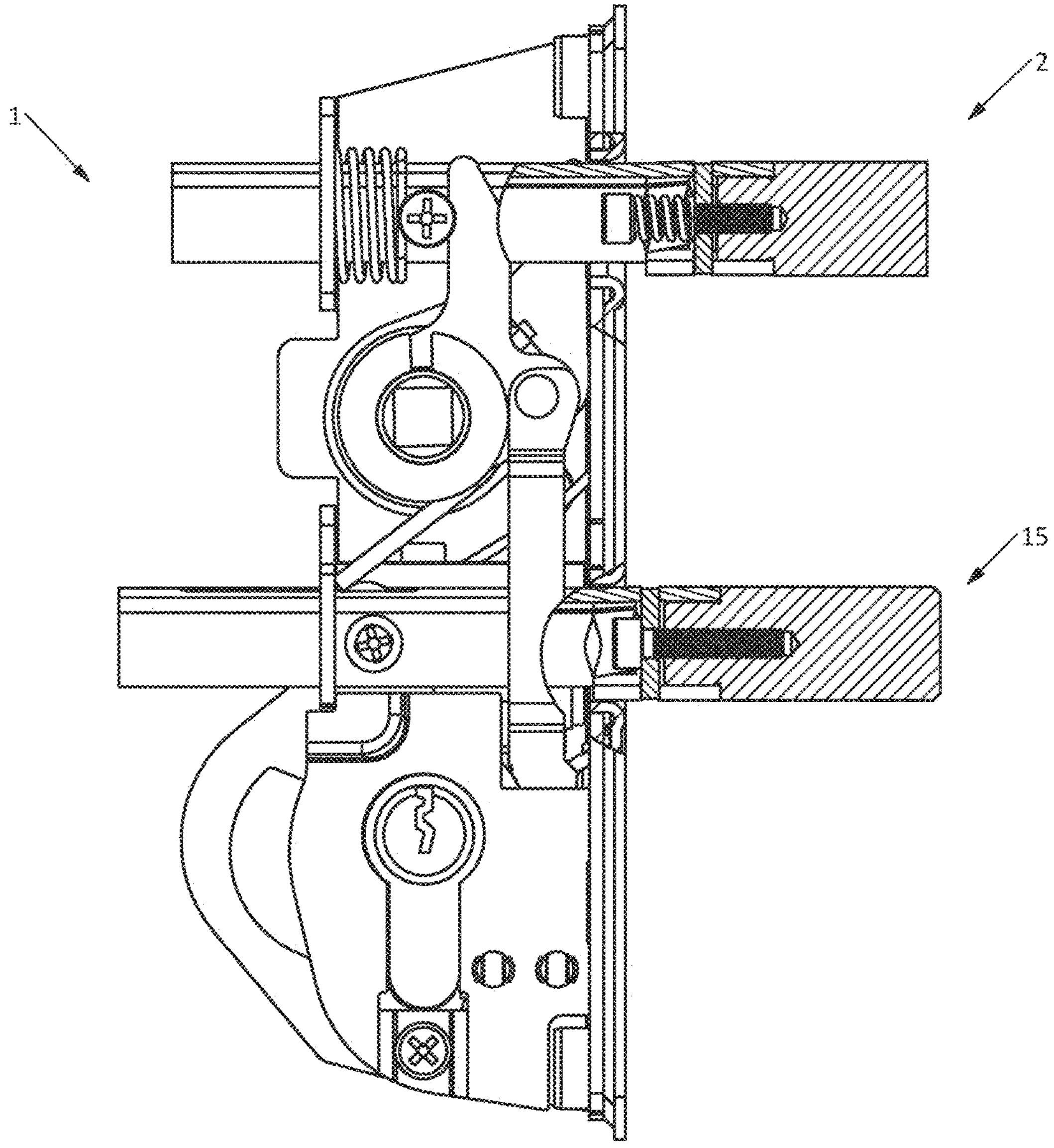

The FIGS. 19-22 show a dead bolt 15 constructed substantially similarly to the latch bolt of FIGS. 15-18, albeit without reversing mechanism. In the embodiments shown in FIGS. 19-22 the channel of the dead bolt 15 extends along the door width direction from the bolt head 33*b* residing in the main body 6*b* up to the free end 34*b* received in a screw hole provided in the tip 7*b*. In the dead bolt 15, there is no second spring. The fixing means comprise the bolt head 33*b*, and further comprise the free end of the proximal portion 38*b* of the tip 7*b*. The retention element 24*b* is clamped directly between the bolt head 33*b* and the free end of the proximal portion 38*b* of the tip 7*b*. Additionally the bolt head 33*b* is clamped between the retention element 24*b* and the shape transition 50*b* of the main body 6*b* thereby forming part of the fixing means. The FIG. 23 shows a view of the lock similar to the view shown in FIG. 1, but wherein the latch bolt 2 and the dead bolt 15 are shown partially in cross-section to reveal the construction of the latch bolt according to the first embodiment shown in FIGS. 15-18 and to reveal the construction of the dead bolt according to the embodiments shown in FIGS. 19-22.

Figure 24:
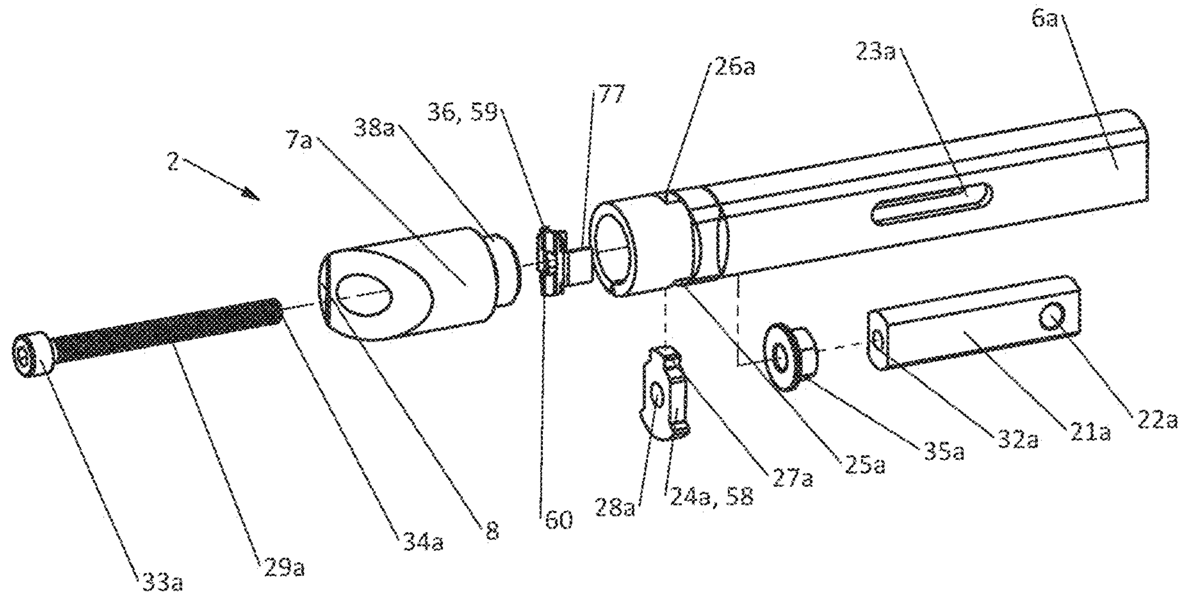
Figure 25:
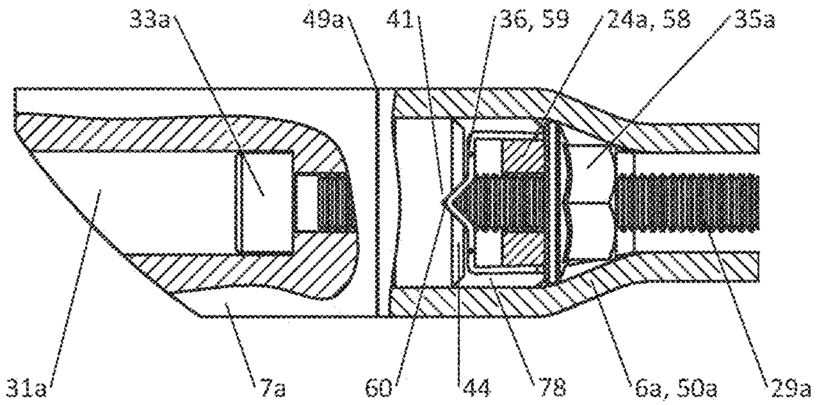
Figure 26:
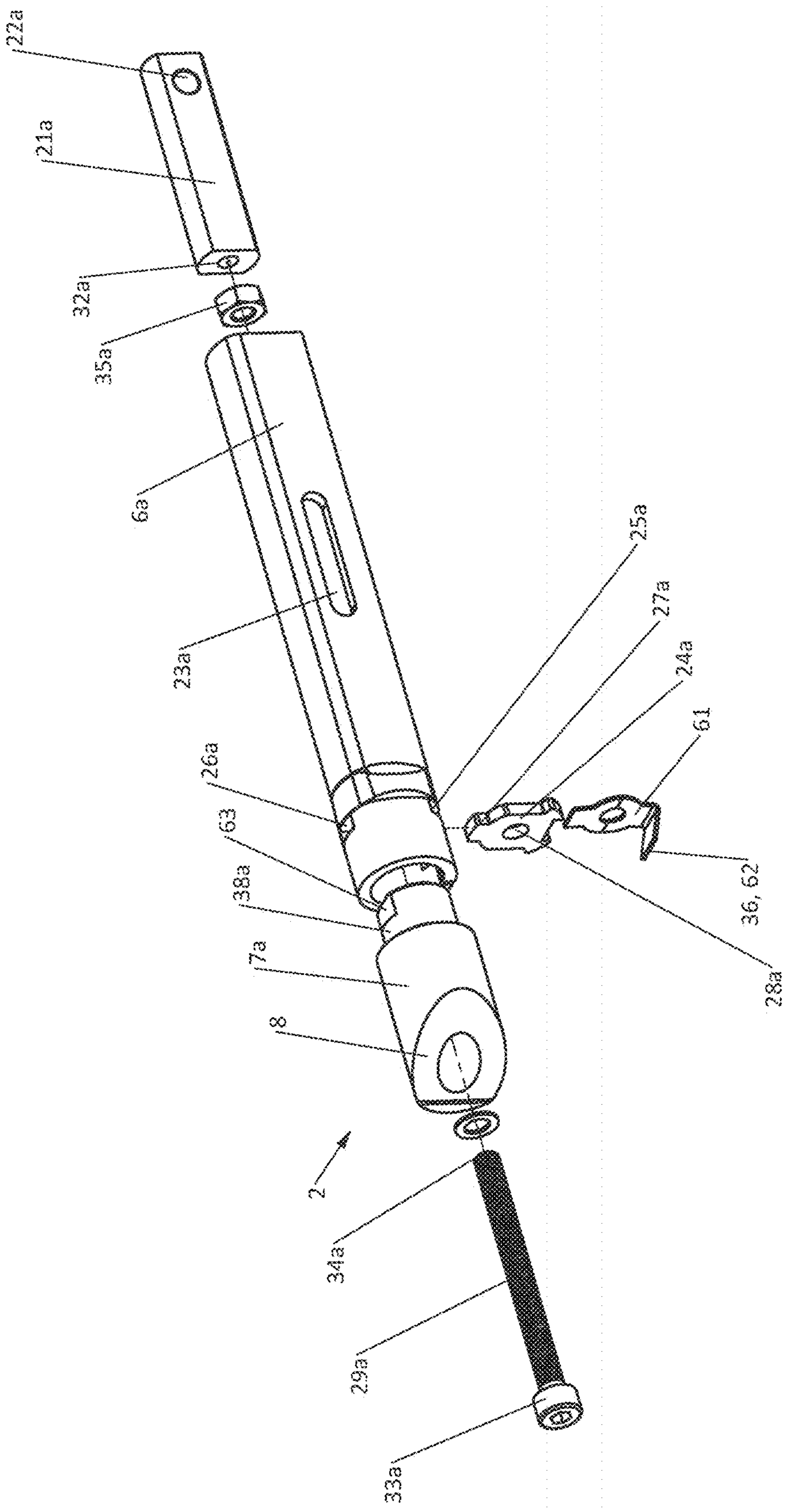
Figure 27:
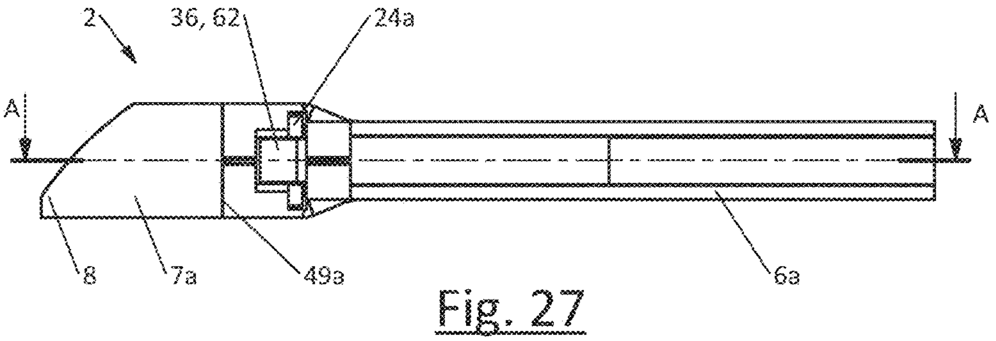
Figure 28:
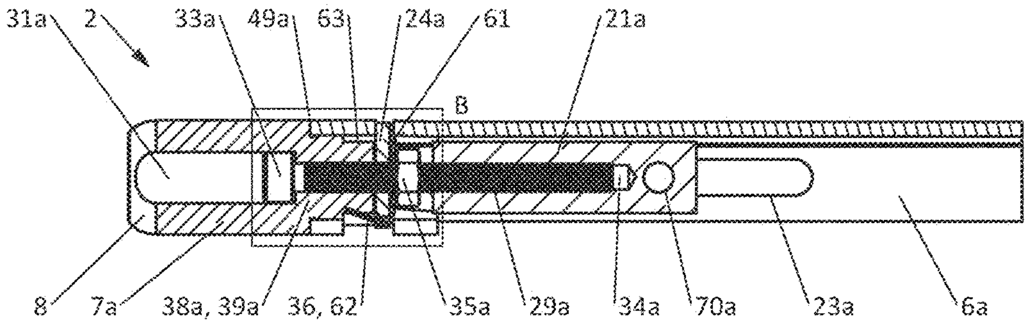
Figure 29:
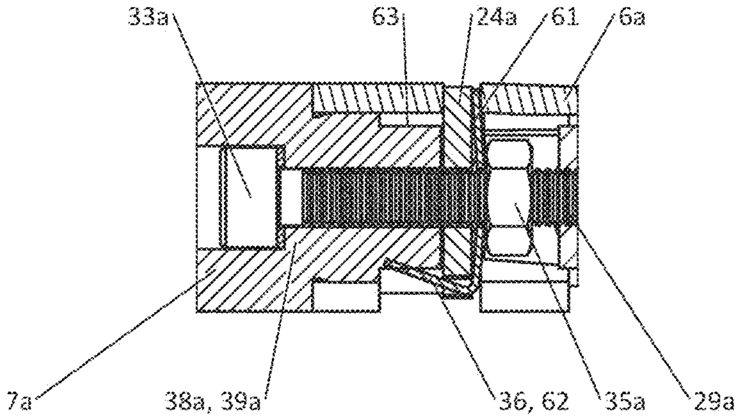

Third Embodiment Shown in FIGS. 24-25

In the third embodiment shown in FIGS. 24-25, the cam is formed by two anchoring projections 44 similar to the one shown in the variant of the first embodiment shown in FIGS. 8-9 as described above.

In this third embodiment the "alternative b)" as described above applies. In this embodiment, the channel extends along the door width direction from an opening 31*a* in the beveled ending 8 in the distal portion of the tip 7*a*, through the tip 7*a*, through at least a portion of the main body 6*a*, through the bolt opening 28*a* in the retention element 24*a*. The bolt head 33*a* resides in the tip 7*a* such as to be accessible through the opening 31*a* of the channel in the beveled end 8 of the tip7*a*, and the free end 34*a* of the bolt 29*a* resides in the main body 6*a*. The retention element 24*a* comprises a primary part 58 formed as a plate like part. An add-on part 59 is attached to the primary part 58 of the retention element 24*a*, i.e. the add-on part 59 itself is not part of the retention element 24*a*. The add-on part 59 is a bended plate folded around a fold line 60, wherein the fold line 60 of the bended plate forms a ridge delimiting the anchoring recessions 30 adjacent to the ridge. The primary part and the add-on part are made of different materials. In the present embodiment, the bended plate of the add-on part 59 is the second spring 36, i.e. the bended plate forms a plate spring. The bolt head 33*a* abuts on an inwardly projecting collar 39*a* provided in the proximal portion 38*a* of the tip 7*a*. The follower is formed by the bended plate of the add-on part 59. The add-on part 59 comprises two connecting legs 77 that clips into leg recesses 78 formed by the primary part 58 of the retention element 24*a*. The fixing means comprise a nut 35*a* fixed to the threaded portion of the bolt 29*a*, and further comprises the bolt head 33*a*. The retention element 24*a* is clamped, by means of i.e. by the intermediary of the second spring 36 and the inwardly projecting collar 39*a*, between the nut 35*a* and the bolt head 33*a*. Additionally the nut 35*a* is clamped between the retention element 24*a* and the shape transition 50*a* of the main body 6*a* thereby forming part of the fixing means.

Fourth Embodiment Shown in FIGS. 26-29

In the fourth embodiment shown in FIGS. 26-29, "alternative b" as described above applies. The second spring 36 is a leaf spring, wherein a first leg 61 of the leaf spring abuts on the retention element 24*a* and wherein the second leg 62 of the leaf spring abuts on the proximal portion 38*a* of the tip 7*a*, such as to bias the proximal portion 38*a* of the tip 7*a* in a direction perpendicular to the door width direction against the wall of the hollow tube of the main body 6*a*. The bolt head 33*a* abuts an inwardly projecting collar 39*a* provided in the proximal portion 38*a* of the tip 7*a*. The fixing means comprise a nut 35*a* fixed to the threaded portion of the bolt 29*a*, and further comprises the bolt head 33*a*. The retention element 24*a* is clamped, by means of i.e. by intermediary of the inwardly projecting collar 39*a*, between the nut 35*a* and the bolt head 33*a*.

The shape of the proximal portion 38*a* of the tip 7*a* is delimited by an outer contour, wherein the cross-section of the outer contour with a plane perpendicular with the door width direction forms a perimeter and wherein the cam is formed by a portion of the proximal portion 38*a* of the tip 7*a* adjacent to the free end thereof having a perimeter comprising two recessed portions 63 provided at opposite sides of the channel. The second leg 62 of the leaf spring 36 rests on one of the recessed portions 63 when the tip 7*a* is in the first angular position and the second leg 62 of the leaf spring 36 rests on the other one of the recessed portions 63 when the tip 7*a* is rotated in the second angular position. In the present embodiment, the follower is formed by the second leg 62 of the leaf spring. The perimeter is substantially circular apart from the recessed portions 63.

The invention claimed is:

1. A lock having a reversible latch bolt, the lock comprising a frame comprising a base plate and a side plate, the latch bolt extending along a door width direction through a latch bolt opening in the side plate, the latch bolt being movably mounted on the frame along the door width direction between a locking and an unlocking position, wherein the latch bolt comprises a main body, a connection assembly, and a tip connected to the main body by the connection assembly, wherein the main body and the tip are aligned along the door width direction, wherein the tip is a substantially cylindrical element comprising a distal portion having a beveled ending configured for impacting on a lock striker, wherein, on the outer surface of the latch bolt, the transition between the main body and the tip is on the outer side of the side plate, a first spring arranged to bias the latch bolt into the locking position by acting on the main body, and an operating mechanism acting on the main body for actuating the latch bolt from its locking to its unlocking position against the action of the first spring, and wherein the latch bolt further comprises a reversing mechanism, the reversing mechanism being arranged to rotate the tip with respect to the main body over 180° along the door width direction from a first angular position to a second angular position, wherein the reversing mechanism comprises the following elements:

a proximal portion of the tip opposite to the distal portion of the tip wherein the proximal portion is arranged to fit inside a receiving portion of the main body, characterized in that the reversing mechanism further comprises the following elements:

the receiving portion of the main body and the proximal portion of the tip respectively form a female and male cylindrical part such that the tip can be rotated between the first and second angular positions whilst residing in the receiving portion of the main body, a second spring, biased to maintain the tip in the first or second angular position when the tip is respectively in the first or second angular position, and a cam and follower assembly, wherein the tip comprises the cam, wherein the cam is arranged to cooperate with the follower upon rotation of the tip between the first and second angular position, wherein the relative movement of the cam and the follower upon rotation of the tip out of the first or second angular positions loads the second spring and wherein the relative movement of the cam and the follower upon rotation of the tip into the first or second angular positions unloads the second spring, \ wherein the cam and follower assembly is arranged to translate the tip with respect to the main body along the door width direction upon rotation of the tip with respect to the main body along the door width direction and wherein said translation loads or unloads the second spring.

2. The lock according to claim 1, wherein the main body is a hollow tube, wherein the main body comprises a retention element fixed within the hollow tube such as to delimit the receiving portion of the main body along the door width direction, wherein the retention element comprises a bolt opening, wherein a bolt, having a bolt head and a screw threaded portion extending between the bolt head and a free end of the bolt, is inserted in a channel extending along the door width direction through at least a portion of the tip, through a portion of the main body and through the bolt opening in the retention element, wherein the bolt head resides in one of the main body or the tip, and wherein the free end of the bolt resides in the other one of the main body or the tip, wherein the latch bolt further comprises fixing means arranged to substantially prevent the movement of the bolt along the door width direction with respect to the retention element.

3. The lock according to claim 2, wherein the channel extends along the door width direction from an opening in the beveled ending in the distal portion of the tip, through the tip, through at least a portion of the main body, through the bolt opening in the retention element, wherein the bolt head resides in the tip such as to be accessible through the opening of the channel in the beveled end of the tip, and wherein the free end of the bolt resides in the main body.

4. The lock according to claim 3, wherein the connection assembly comprises a length adjustment mechanism arranged to adjust the distance along the door width direction that the latch bolt extends from the latch bolt opening when the latch bolt is in the locking position, wherein the length adjusting mechanism comprises the following elements:

a pin holder slideably arranged within the main body, wherein the pin holder holds one or more abutment pins on which the first spring and the operating mechanism abut, wherein the pin holder is slideably arranged between a close position and a far position in which the pin holder is respectively closer and more remote from the tip, the bolt arranged as an adjustment bolt, the free end of the adjustment bolt being received in a screw hole provided in the pin holder, and wherein the rotation of the adjustment bolt along its axis in the door width direction results in the screwing of the adjustment bolt in or out of the pin holder which results in the sliding of the pin holder respectively towards the close or far position.

5. The lock according to claim 3, wherein the cam comprises one of at least one anchoring projection protruding along the door width direction or at least two anchoring recesses, and wherein the main body comprises the other one of the at least one anchoring projections and the anchoring recesses such that the anchoring recesses are arranged to receive the anchoring projection at least when the tip is in either one of the first or second angular position, preferably at most when the tip is in either one of the first or second angular positions, wherein preferably the at least one anchoring projection is formed by a groove applied in the proximal portion of the tip, wherein the groove is elongated substantially perpendicularly to the door width direction, and wherein preferably the groove has angled walls.

6. The lock according to claim 5, wherein the cam and follower assembly is arranged to translate the tip with respect to the main body along the door width direction upon rotation of the tip with respect to the main body along the door width direction and wherein said translation loads or unloads the second spring, wherein the second spring is a compression spiral spring, wherein the second spring is arranged coaxially over the bolt between the bolt head of the bolt and an inwardly projecting collar provided in the proximal portion of the tip such as to urge the tip towards the main body, and wherein the translation of the tip in the door width direction moves the inwardly projecting collar towards or away from the bolt head such as to respectively compress or relax the second spring, wherein preferably the fixing means comprise a fixation element fixed to the threaded portion of the bolt, and the bolt head, wherein the retention element is clamped by means of the second spring and the inwardly projecting collar between the fixation element and the free end of the proximal portion of the tip, and wherein preferably the fixation element comprises a rotation hindering element.

7. The lock according to claim 2, wherein the cam comprises one of at least one anchoring projection protruding along the door width direction or at least two anchoring recesses, and wherein the main body comprises the other one of the at least one anchoring projections and the anchoring recesses such that the anchoring recesses are arranged to receive the anchoring projection at least when the tip is in either one of the first or second angular position, preferably at most when the tip is in either one of the first or second angular positions, wherein preferably the at least one anchoring projection is formed by a groove applied in the proximal portion of the tip, wherein the groove is elongated substantially perpendicularly to the door width direction, and wherein preferably the groove has angled walls.

8. The lock according to claim 7, wherein the proximal portion of the tip has an outwardly chamfered circumferential edge.

9. The lock according to claim 7, wherein the amount that each anchoring projection protrudes in the door width direction follows a gradient, wherein the gradient comprises a steep part adjacent to the positions of minimal protrusion and a less steep intermediate part between the steep parts.

10. The lock according to claim 7, wherein the cam and follower assembly is arranged to translate the tip with respect to the main body along the door width direction upon rotation of the tip with respect to the main body along the door width direction and wherein said translation loads or unloads the second spring, wherein the bolt extends along the door width direction from the bolt head residing in the main body up to the free end received in a screw hole provided in the tip, wherein the second spring is a compression spiral spring, wherein the second spring is arranged coaxially over the bolt between the bolt head of the bolt and the retention element such as to urge the tip towards the main body, and wherein the translation of the tip in the door width direction moves the bolt head towards or away from the retention element such as to respectively compress or relax the second spring, wherein preferably the fixing means comprise the bolt head, and the free end of the proximal portion of the tip, wherein the retention element is clamped by means of the second spring between the bolt head and the free end of the proximal portion of the tip.

11. The lock according to claim 2, wherein the retention element is inserted in transversal openings provided in the hollow tube walls of the main body such as to fixate the retention plate in the hollow tube of the main body.

12. The lock according to claim 1, wherein the base plate comprises a key cylinder opening for receiving a key cylinder, wherein the side plate further comprises a dead bolt opening for receiving a dead bolt, the frame having mounted thereon the following elements:

a dead bolt extending along the door width direction through the dead bolt opening, the dead bolt being movably mounted on the frame along the door width direction between a locking and an unlocking position by means of a key cylinder, wherein the dead bolt comprises a main body and a tip connected to the main body, wherein the main body is a hollow tube, wherein the main body and the tip are aligned along the door width direction, wherein the tip is a cylindrical element comprising a free ending arranged to enter into a corresponding dead bolt slot in a striking plate, and wherein the main body is preferably provided with an attachment pin, a mechanism for actuating the dead bolt upon rotation of a key in the key cylinder to move the dead bolt from its locking to its unlocking position and vice versa, wherein the mechanism for actuating the dead bolt comprises a dead bolt lever acting on the main body of the dead bolt, preferably on the attachment pin and following the rotation of the key in the key cylinder, and wherein the dead bolt preferably comprises a dead bolt length adjustment mechanism arranged to adjust the distance along the door width direction that the dead bolt extends from the dead bolt opening when the dead bolt is in the locking position, wherein the dead bolt length adjusting mechanism comprises the following elements:

an attachment pin holder slideably arranged within the main body of the dead bolt, wherein the attachment pin holder holds the attachment pin, wherein the attachment pin holder is slideably arranged between a close position and a far position in which the attachment pin holder is respectively closer and more remote from the tip of the dead bolt, a retention element fixed within the main body of the dead bolt, the retention element delimiting the insertion depth of the tip into the main body along the door width direction, wherein the retention element comprises an adjustment bolt opening through which an adjustment bolt extending in the door width direction is inserted, an adjustment bolt inserted in a channel extending along the door width direction from an opening in the free ending of the tip of the dead bolt, through the tip of the dead bolt, through at least a part of the main body of the dead bolt, through the adjustment bolt opening in the retention element, and ending in a screw hole provided in the attachment pin holder, wherein the adjustment bolt extends along the door width direction from a bolt head accessible through the opening of the channel in the free end of the tip of the dead bolt up to a free end received in the screw hole of the attachment pin holder, and fixing means for substantially preventing the movement of the adjustment bolt along the door width direction such that the rotation of the adjustment bolt along its axis in the door width direction results in the screwing of the adjustment bolt in or out of the attachment pin holder which results in the sliding of the attachment pin holder respectively towards the close or far position.

13. The lock according to claim 12, wherein the main body of the latch bolt is formed from a plate bended along the door width direction, wherein preferably adjacent edges of the bended plate form a slit at the positions outside of the receiving portion and wherein the edges of the bended plate form a seam in the receiving portion, wherein preferably adjacent edges of the seam are welded together at least in one point preferably, and wherein preferably the transversal openings are punched out of the plate, and wherein the main body of the dead bolt and the main body of the latch bolt have a substantially similar bended plate and transversal openings.

14. The lock according to claim 1, wherein the main body of the latch bolt is formed from a plate bended along the door width direction, wherein preferably adjacent edges of the bended plate form a slit at the positions outside of the receiving portion and wherein the edges of the bended plate form a seam in the receiving portion, wherein preferably adjacent edges of the seam are welded together at least in one point preferably, and wherein preferably the transversal openings are punched out of the plate.

* * * * *